US012282727B2

(12) United States Patent
Dolan et al.

(10) Patent No.: US 12,282,727 B2
(45) Date of Patent: Apr. 22, 2025

(54) AUTOMATIC DOCUMENT SKETCHING

(71) Applicant: Microsoft Technology Licensing, LLC, Redmond, WA (US)

(72) Inventors: William B. Dolan, Kirkland, WA (US); Zeqiu Wu, Seattle, WA (US); Michel Galley, Seattle, WA (US); Yizhe Zhang, Seattle, WA (US); Zhang Li, Seattle, WA (US); Christopher John Brockett, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 500 days.

(21) Appl. No.: 17/146,133

(22) Filed: Jan. 11, 2021

(65) Prior Publication Data

US 2022/0164520 A1 May 26, 2022

Related U.S. Application Data

(60) Provisional application No. 63/117,377, filed on Nov. 23, 2020.

(51) Int. Cl.
*G06F 40/106* (2020.01)
*G06F 40/18* (2020.01)
*G06N 20/00* (2019.01)

(52) U.S. Cl.
CPC ............ *G06F 40/106* (2020.01); *G06F 40/18* (2020.01); *G06N 20/00* (2019.01)

(58) Field of Classification Search
CPC .................................................. G06F 40/106
See application file for complete search history.

(56) References Cited

U.S. PATENT DOCUMENTS

| | | | |
|---|---|---|---|
| 8,959,109 B2* | 2/2015 | Scott | G06F 16/332 707/769 |
| 9,547,420 B1* | 1/2017 | Cassidy | G06F 3/04883 |
| 2004/0268236 A1* | 12/2004 | Chidlovskii | G06F 40/143 715/234 |

(Continued)

OTHER PUBLICATIONS

Zhang et al., "AI-Powered Text Generation for Harmonious Human Machine Interaction: Current State and Future Directions" copyright 2019 IEEE, pp. 859-864. (Year: 2019).*

(Continued)

*Primary Examiner* — Amelia L Tapp

(57) ABSTRACT

Systems and method directed to assistive document generation are described. More specifically, similar documents share large portions of reusable text structures that can be used to generate an initial document thereby saving a user time. To generate the document, an indication to create the document may be received and based on the indication, a plurality of example documents and grounding content may be identified. Example documents may be existing documents that are similar to a target document of the writer. Grounding information may refer to content that is relevant, timely, and accurate when applied to the target document. The plurality of example documents and the grounding content may be received, and a document sketch based on the example documents and the grounding content may be generated and contains a plurality of predicted text sequences based on the example documents and the grounding content.

20 Claims, 15 Drawing Sheets

(56) References Cited

U.S. PATENT DOCUMENTS

2016/0188143 A1    6/2016  Kohlmeier et al.
2020/0134103 A1*   4/2020  Mankovskii ............ G06F 40/56
2020/0302016 A1*   9/2020  Aggarwal ............ G06V 30/414

OTHER PUBLICATIONS

Jarzabek, et al., "Documentation Reuse: Managing Similar Documents", In Proceedings of International Conference on Information Reuse and Integration, Aug. 4, 2017, pp. 372-375.
"International Search Report and Written Opinion Issued in PCT Application No. PCT/US2021/053454", Mailed Date: Jan. 28, 2022, 10 Pages.

* cited by examiner

WHEAT

Global production has risen sharply by 15 percent for most exporters due to market concerns about tight supplies and strong demand. On the demand side, global consumption is also rising steadily. Stronger import demand in the U.S. is expected to more than offset reduced shipments from Ukraine and the European Union. The projected U.S. season-average farm prices is down $0.20 to $5.00 bushel.

Domestic wheat: Prices for most U.S. wheat classes were lower since the end of April based on expectations of a larger global wheat crop and generally favorable conditions for U.S. winter wheat. Price movements were particularly pronounced around the time of USDA releasing the May 2020 WASDE report. Most classes of wheat found some support towards the end of May based on forecasts for hot and dry weather across some winter wheat growing areas and renewed concerns over dryness in Europe and the Black Sea.

RICE

Global rice production is raised slightly this month primarily on larger crops in Brazil and Nigeria. Global trade is reduced slightly on lower demand from Brazil and Indonesia. Exports are likewise down marginally with lower forecasts for Thailand and the United States partially offset by a higher forecast for Vietnam.

Preview

Here are a few other ways to write this:

▸ Global production soared 15-30 percent for exporters due to demand and limited supplies.

▸ Global production rose more than 15 percent for exporters due to concerns about market supplies and strong demand.

▸ World production rose sharply 15-30 percent for exporters due to concerns about market supplies and strong demand.

More

*Fig. 6*

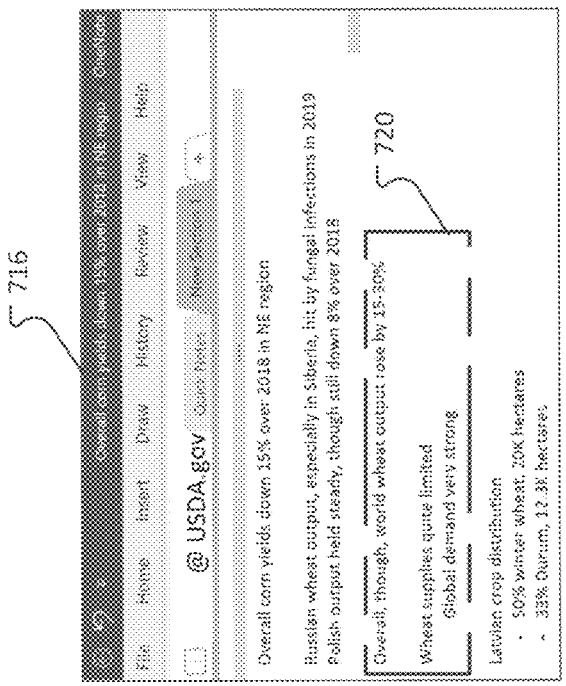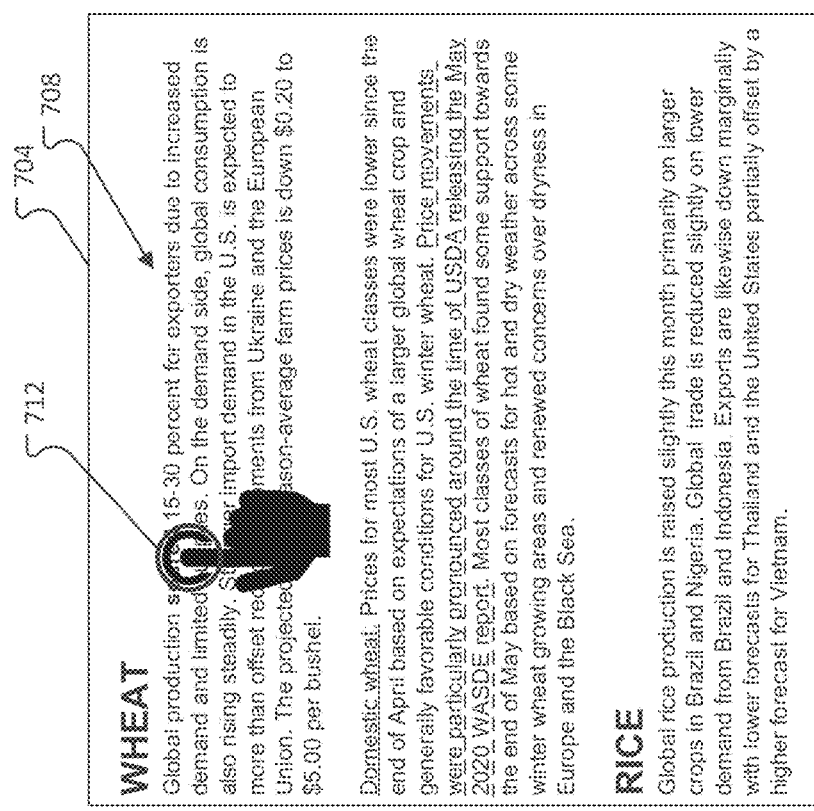
Fig. 7

WHEAT

Global production has risen sharply by 15-30 percent for most exporters due to market concerns about tight supplies and strong demand. On the demand side, global consumption is also rising. Stronger import demand in the U.S. is expected to more ~~than~~ reduced shipments from Ukraine and the European Union. T~~he projec~~ted U.S. season-average farm prices is down $0.20 to $5.00 ~~per b~~ushel.

Domestic wheat: Prices for most U.S. wheat classes were lower since the end of April based on expectations of a larger global wheat crop and generally favorable conditions for U.S. winter wheat. Price movements were particularly pronounced around the time of USDA releasing the May 2020 WASDE report. Most classes of wheat found some support towards the end of May based on forecasts for hot and dry weather across some winter wheat growing areas and renewed concerns over dryness in Europe and the Black Sea.

RICE

Global rice production is raised slightly this month primarily on larger crops in Brazil and Nigeria. Global trade is reduced slightly on lower demand from Brazil and Indonesia. Exports are likewise down marginally with lower forecasts for Thailand and the United States partially offset by a higher forecast for Vietnam.

---

Here are a few other ways to write this:

Global production soar~~ed~~ 15-30 percent for exporters due to increased demand and limited sup~~ply~~.

Global production ros~~e~~ 15 percent for exporters due to concerns about market ~~supplies~~ and strong demand.

World production rose sharply 15-30 percent for exporters due to concerns about market supplies and strong demand.

[More] [Preview]

---

@ USDA.gov

Russian corn yields down 15% over 2018 in NE region.

Polish wheat output, especially in Siberia, hit by fungal infections in 2019
Polish output held steady, though still down 8% over 2018

Overall, though, world wheat output rose by 15-30%
Wheat supplies quite limited
Global demand very strong Latvian crop distribution:
- 50% winter wheat, 20K hectares
- 33% Durum, 12.3K hectares

*Fig. 8*

AUTOMATIC DOCUMENT SKETCHING

CROSS-REFERENCE TO RELATED APPLICATIONS

The present disclosure claims priority to U.S. Provisional Patent Application No. 63/117,377 filed Nov. 23, 2020, the disclosure of which is hereby incorporated by reference in its entirety.

BACKGROUND

Automated document generation is challenging at least partially due to user specific semantics which can dramatically influence how a document is drafted. Recent large pre-trained language models like T5 or GPT3 have made impressive progress on a variety of natural language generation tasks and may produce fluent and context-aware text sequences that are even able to fool humans. For example, given document metadata, such models can be applied to fully automate the generation of stories or news articles. However, in practical cases where the written document should be constrained by factual correctness or human control, fully automated generation models are not desired due to their tendency towards generating hallucinated content. That is, fully automated generation models tend to generate text which may not be true, or are at least is not grounded by the input data.

Instead, applying language models to auto-complete dynamic human input as the input is provided to the model could be a better alternative to assist a user with the creation of the document. However, such incremental writing that generally follows the left-to-right order tends to lack document structure, which is what users naturally do as the first step in writing a document. In many practical cases, users tend to start writing a document utilizing previously written documents as guides and/or may reuse an existing document. For example, before writing a reference letter, a person might find one or more previously written letters of the same purpose providing an example or guide to follow. The user may then provide details at various places in the reused and tailored document to generate a final document. As the final document is generally free of hallucinated content, so too should a document automatically generated by an automated document generation model.

SUMMARY

Aspects of the present disclosure are directed to automated document generating utilizing a plurality of preexisting example documents grounding content. Some examples include a method of generating a document. The method may include receiving an indication to create a document sketch, determining, based on the indication, a plurality of example documents and grounding content, receiving the plurality of example documents, receiving the grounding content, and generating the document sketch based on the example documents and the grounding content, the document sketch including a plurality of predicted text sequences.

In addition, some examples include a method of generating a document. The method may include receiving an indication to create a document sketch, determining, based on the indication, a plurality of example documents and grounding content, receiving the plurality of example documents, receiving the grounding content, generating the document sketch based on the example documents and the grounding content, the document sketch including a plurality of predicted text sequences, identifying a predicted text sequence having an associated generation confidence score that is less than a threshold, and causing the identified predicted text sequence to be displayed at an output device in a manner that is different from a predicted text sequence having an associated generation confidence score that is greater than the threshold.

Some examples are directed to a system including a processor and memory. The memory may include instructions which when executed by the processor, causes the processor to: receive a previously generated document sketch, the document sketch being based on a plurality of example documents, retrieve grounding content from a grounding content source, generate a revised document sketch based on the grounding content, the document sketch including a plurality of predicted text sequences based on the grounding content.

BRIEF DESCRIPTION OF THE DRAWINGS

Non-limiting and non-exhaustive examples are described with reference to the following Figures.

FIGS. 5-8 depict examples directed to co-authoring one or more document sketches in accordance with examples of the present disclosure.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Automated document generation is challenging at least partially due to user specific semantics which can dramatically influence how a document is drafted. While a variety of natural language generation models produce fluent and context-aware text sequences, in instances where a written document should be constrained by factual correctness, such models are not desired due to their tendency towards generating hallucinated content. Hallucinated content may refer to content that is generated/written by a machine model with various levels of accuracy; in some instances, the hallucinated content may not be true, or is at least not reflective of the input data. For example, likely content may be hallucinated using a probabilistic mode which may not be directly grounded in the detections performed on the input content and/or context but has a high probability of occurring based on corpus data. Aspects of the present disclosure address the issue of hallucinated content by utilizing grounding information to ground predicted text sequence or otherwise increase the probability that predicted text sequences reflect the concept or idea of the grounding data. In addition, similar to using an example document as a basis for writing a target document, aspects of the present disclosure utilize example documents to produce an initial target document sketch, where the document sketch may include reusable text portions and formatting identified from the example documents. Based on the grounding information, predicted text sequences may be included in the documents sketch.

Figure 1:
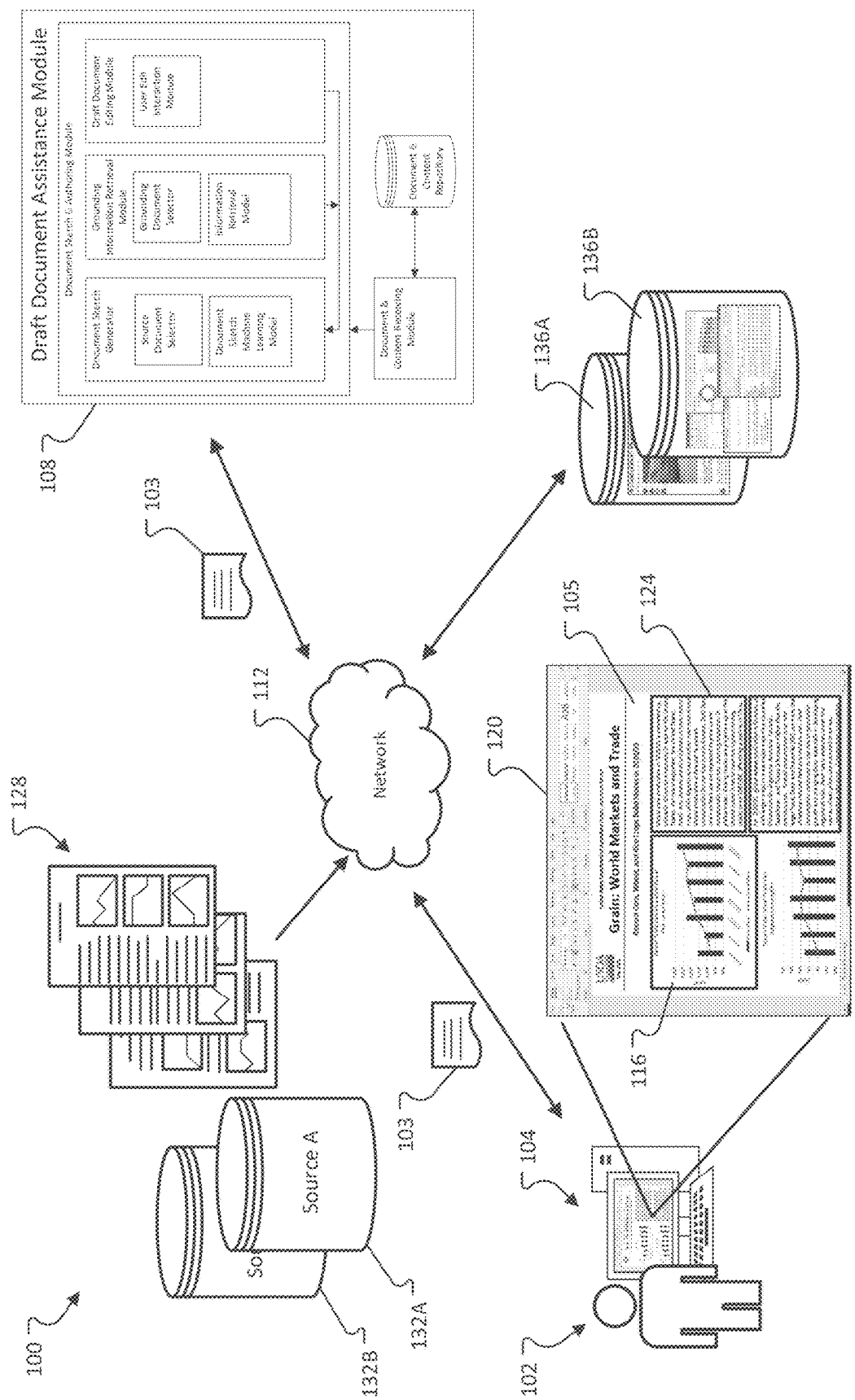
FIG. 1 depicts a document co-authoring system in accordance with examples of the present disclosure.

FIG. 1 depicts a document co-authoring system 100 in accordance with examples of the present disclosure. The document co-authoring system 100 may allow a user 102 utilizing a processing device 104 to view and/or edit a document sketch 105 that was auto-generated based a plurality of example documents and content grounding sources derived from a user's intent. The processing device 104 may allow the user 102 to interact with the draft document assistance module 108 via the network 112 and provide a proposed task 103 to the draft document assistance module 108. The proposed task 103 may convey an intent and one or more sources of data, or resources, on which a document sketch 105 may be based. For example, the proposed task 103 may be "draft a regular monthly grain report using current spreadsheet data and information from Sora's email received yesterday." Accordingly, the proposed task 103 may include the intent (e.g., draft a regular monthly grain report) and identify sources of data and/or resources (such as the current spreadsheet data and information from Sora's email) of which to locate content such that the document sketch 105 may be generated. As another example, the draft document assistance module 108 may receive a plurality of example documents 128 from one or more data sources 132A-132B based on the proposed task 103. The draft document assistance module 108 may also receive content 136A-136B; accordingly, the draft document assistance module 108 may generate a document sketch 105 utilizing one or more machine learning algorithms, such as but not limited to a neural network, based on the example documents 128 and grounding content 136A-136B. Thus, the document sketch 105 may be generated as an initial template-like document based on the example documents 128, where the example documents 128 may provide example formats, structures, and in some instances content that may be common across the documents 128. In examples, the documents 128 may be selected by the user or otherwise include a set or collection of a plurality of similar documents.

In some examples, the document sketch 105 may include one or more areas, such as predicted text regions 116 and 124, that are generated or otherwise include text predicted by the draft document assistance module based on the example documents 128 and the grounding content 136A-136B. For example, grounding information may be derived from or based on the grounding content 136A-136B; the grounding information may be provided to a machine learning model such that the machine learning model may generate a predicted text sequence that is grounded using the grounding content 136A-136B; the predicted text sequence may then be included in one or more of the predicted text regions, such as 116 and 124 of the document sketch 105. Accordingly, an initial document sketch 105 may assist human writers by reducing manual editing efforts (e.g., extra time required for planning, inserting and deleting content, etc.). Thus, the document sketch 105 may contain structural or reusable text based on the example documents 128, one or more predicted text regions 116 and 124 including predicted text sequence based on the grounding content 136A-136B, and leave blanks, or spaces, where user input may be needed. In examples, a predicted text sequence may include a blank, space, ellipses, and/or other symbol indicating user input may be needed. In some examples, a label or semantic tag of a segment of text (e.g., "COMPANY NAME") might be displayed instead of and/or in addition to a blank, ellipsis, or other symbol, where the label or semantic tag is identifiable from context.

In some examples, the content generated by the draft document assistance module 108 that is determined to be or otherwise include a predicted text sequence that is to be reviewed by a user may be identified and/or flagged. For example, a word selection criteria, such as but not limited to a confidence score, may be associated with a predicted text sequence and/or the predicted text region in which the predicted text sequence resides. The predicted text region 124 may include content, such as the predicted text sequence that is generated by the draft document assistance module 108. If a word selection criteria, such as the confidence score of the predicted text sequence, is less than a threshold, such as a threshold confidence score, the predicted text sequence in the predicted text region 124 that is generated by the draft document assistance module 108 may be differentiated from other content, such as other predicted text regions and/or other predicted text sequences, within the document sketch 105. In some examples, the predicted text sequence in the predicted text region 124 having a word selection criteria, such as a confidence score, that is less than a threshold may be highlighted, italicized, underlined, tagged, or may be set apart from other content in the document sketch in a similar manner. Accordingly, a user's attention may be directed to such areas for review.

As another example, the content generated by the draft document assistance module 108 that is to be reviewed by a user may be generated as an ellipsis token, blank, or other symbol indicating that content is to be supplied by a user. For example, the draft document assistance module 108 may determine with a high confidence to predict a blank. The blank may indicate that a user is to supply content, or otherwise fill in the blank with user supplied content rather than content being predicted by the draft document assistance module 108. Accordingly, a user's attention may be directed to such areas that include ellipses, blanks, or other symbols such that the user can provide additional content. In some examples, the predicted text sequence in the predicted text region 124 having a word selection criteria, or confidence score, that is less than a threshold may be replaced with blanks, ellipses, or other symbol and/or may be set apart from other content in the document. Accordingly, a user's attention may be directed to such areas for review. In some examples, a label or semantic tag of a segment of text (e.g., "COMPANY NAME") might be displayed instead of and/or in addition to a blank, ellipsis, or other symbol, where the label or semantic tag is identifiable from context. Accordingly, a user's attention may be directed to the label or semantic tag.

In some examples, the draft document assistance module 108 may identify a first predicted text sequence or first predicted text region within the document sketch 105 and highlight such region for user review based on the corresponding word selection criteria such as the confidence score. In some examples, the first predicted text sequence and/or the first predicted text region that is highlighted for user review may be spatially located after a second predicted text sequence or second predicted text region within the document sketch 105 that is highlighted for user review based on a different word selection criteria, such as the confidence score. For example, a first predicted text sequence highlighted for user review may reside on page four of a document sketch while a second predicted text sequence may reside on page two of the same document sketch. In examples, the second predicted text sequence may only be highlighted once a user has reviewed the first predicted text sequence. In some examples, once the user has reviewed the first predicted text sequence, other predicted text sequences and regions that may be dependent on the first predicted text sequence may change.

Figure 2:
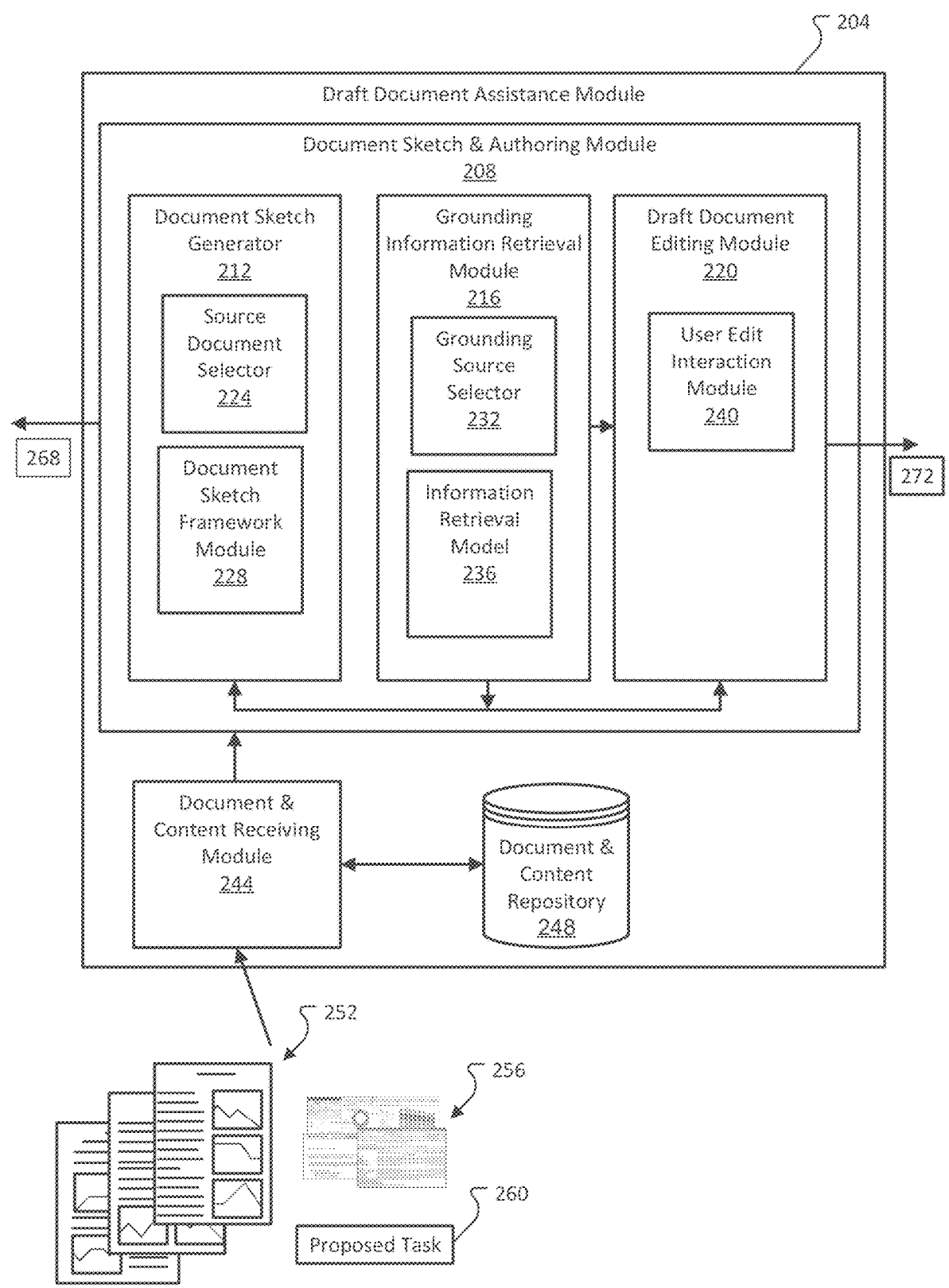
FIG. 2 depicts additional details of a draft document assistance module in accordance with examples of the present disclosure.

FIG. 2 depicts additional details of a draft document assistance module 204 in accordance with examples of the present disclosure. The draft document assistance module 204 may be the same as or similar to the draft document assistance module 108 of FIG. 1. The draft document assistance module 204 may include a document sketch & authoring module 208, a document & content receiving module 244, and a document & content repository 248. The document sketch & authoring module 208 may include a document sketch generator 212, a grounding information retrieval module 216, and a draft document editing module 220. In examples, a proposed task 260 may be received at the draft document assistance module 204; a user intent and one or more sources may be determined by the draft document assistance module 204 based on the proposed task 260. In examples, one or more of the document & content receiving module 244, the document sketch generator 212, and/or the grounding information retrieval module 216 may determine, extract, or otherwise identify one or more intents and one or more sources from the proposed task 260. In some instances, the one or more sources may correspond to one or more example documents 252 and/or grounding content 256, where the one or more example documents 252 may be the same as or similar to the one or more documents 128 as previously described and the grounding content 256 may be the same as or similar to the grounding content 136A-136B as previously described.

Based on the received proposed task 260, a plurality of example documents 252 may be identified, located, and/or received at the document & content receiving module 244. In examples, based on the proposed task 260, the source document selector 224 may identify, locate, and/or request example documents 252. For example, if the proposed task was equal to "One of the regular monthly grain reports. Use current spreadsheet data and also pull info about the Canadian wheat harvest from Sora's mail yesterday," the source document selector 224 may identify a plurality of documents that are determined to be "one of the regular monthly grain reports." In non-limiting examples, one or more documents 252 may include a label indicating that it is a monthly grain report, may be located in a file or folder attributed with monthly grain reports, or the content of such document may be analyzed by the source document selector 224 and determined, by the source document selector 224, to be a monthly grain report based on the content. In some examples, a clustering algorithm may be utilized to determine documents to be used as an example document 252. For example, based on an example document 252, additional similar example documents may be identified and retrieved based on a cluster analysis. Such document clustering analysis may include, but is not limited to a k-means clustering, brown clustering, and/or clustering based on term frequency and inverse document frequency. In some instances, the example documents 252 may reside at a public location; in some examples, the example documents 252 may reside at a private location, such as but not limited to an intranet, a portal, a private document collection residing on a computing device, or other location. The source document selector 224 may provide the example documents 252 for example, to the document sketch framework module 228 such that a document sketch may be generated.

In accordance with some examples of the present disclosure, a document sketching task performed by the document sketch framework module may generate an initial document sketch—a template-like draft—to facilitate a target document writing, based on a collection of sample documents. That is, a document sketching task may generate a text sequence s that can be used as the document sketch to reduce the writing effort of a target document y given a set of n documents $X=\{x_1, x_2, \ldots, x_n\}$. A score of each text sequence s, given document y, may be generated according to Equation 1 below, where WER is equal to the writing effort and Levenshtein(s,y) is the Levenshtein distance, where the Levenshtein distance is the minimum number of single-character edits (insertions, deletions or substitutions) required to change one word into the other.

$$\text{score}(s, y) = 1 - WER(s, y) \qquad (1)$$
$$= 1 - \frac{Levenshtein(s, y)}{|y|}$$

Accordingly, the higher the score (s, y), the fewer minimum word-level insertion and deletion edits a user would be predicted to need in order to complete writing target y if starting with the text sequence s. Therefore, such an automatic evaluation approximates the effectiveness of the generated initial document sketches for assisting target document writing. However, like most text generation tasks, a human evaluation may be utilized for final system comparisons. In order to account for the linguistic variety of writing a target document, an average score of multiple reference documents Y, such as the example documents 252, may be calculated, instead of using a single score for each reference document y.

$$\text{score}(s, Y) = \frac{1}{m}\sum_{i=1}^{m}\left(1 - \frac{Levenshtein(s, y_i)}{|y_i|}\right) \qquad (2)$$

where Y={$y_1, y_2, \ldots, y_m$} and m denotes the number of reference documents.

In examples, the example documents 252 may comprise a dataset used for the document sketching task. Specifically, documents may be clustered into collections from one or more data sources 132A-132B, such that each document collection contains documents that are most likely to share reusable text portions; each document collection may then be converted into smaller data points for training, validation and testing purposes. Additional details directed to identifying document collections as well as processing data points is provided below.

In examples, documents titles may provide a strong indication of whether documents are likely to be in the same collection and share certain boilerplate text or not. For example, it is reasonable to consider documents with titles being "Super Bowl I", "Super Bowl II" and so on to comprise a document collection of the annual championship game. Therefore, documents whose titles are exactly the same except one token at a specific position may be clustered together. In the "Super Bowl" example above, the document titles are the same except the third token in each title, and the collection can be named as "Super Bowl _", where the "_" is an ellipses token."

However, title matching may lead to noise in the extracted document collections; accordingly, in order to remove individual documents that are potential sources of noise in each collection, Equation 2 may be applied to calculate the average similarity score of each document with the other documents in a collection and remove those with an average score lower than an empirically chosen threshold, for example, but not limited to −1.5. Document collections with more than a threshold number of documents may be retained and truncated to a maximum collection size, which may then be divide into training, evaluation, and testing sets by, for example, a ratio of 0.8/0.1/0.1.

Each document collection may be divided into multiple smaller data points. For example, when using a standard supervised training model, each data point may include a document d for constructing a heuristic sketch as weak supervision and up to a number of, such as nine, input documents X. For evaluation, additional documents (such as four additional document for example) may be used as references Y to calculate the document collection score as depicted in Equation 2. As document collections whose differing title tokens may be a number, such as a number about events or entities of different times (e.g., Super Bowl XX), documents in the document collection may be ordered by the ascending numbers to imitate practical scenarios where a human sketches a document by looking at previously written documents for such collections. Therefore, and as an example, each document collection may be divided into data points in a manner such that the temporal relationships between documents are maintained.

As gold document sketches are not available for supervised training, a weakly supervised training may be performed by constructing heuristic sketches as the targets. Then, reinforcement learning strategies may be applied for generating text to further improve the model performance. With respect to weakly-supervised learning, as discussed above, each data point may include a document d for creating the semi-supervised sketch. Thus, pair-wise sequence alignment may be performed for d and each input document $x_i \in X$; the relative alignment frequency may be counted (# being aligned divided by |X|=n) of each token in d. Tokens with the relative frequency higher than a threshold may be retained and may replace other tokens having an ellipsis token, which becomes the heuristic target sketch s given X. The threshold may be empirically chosen to be 0.6, which may provide the highest average score(s, Y) on valid set.

Figure 3:
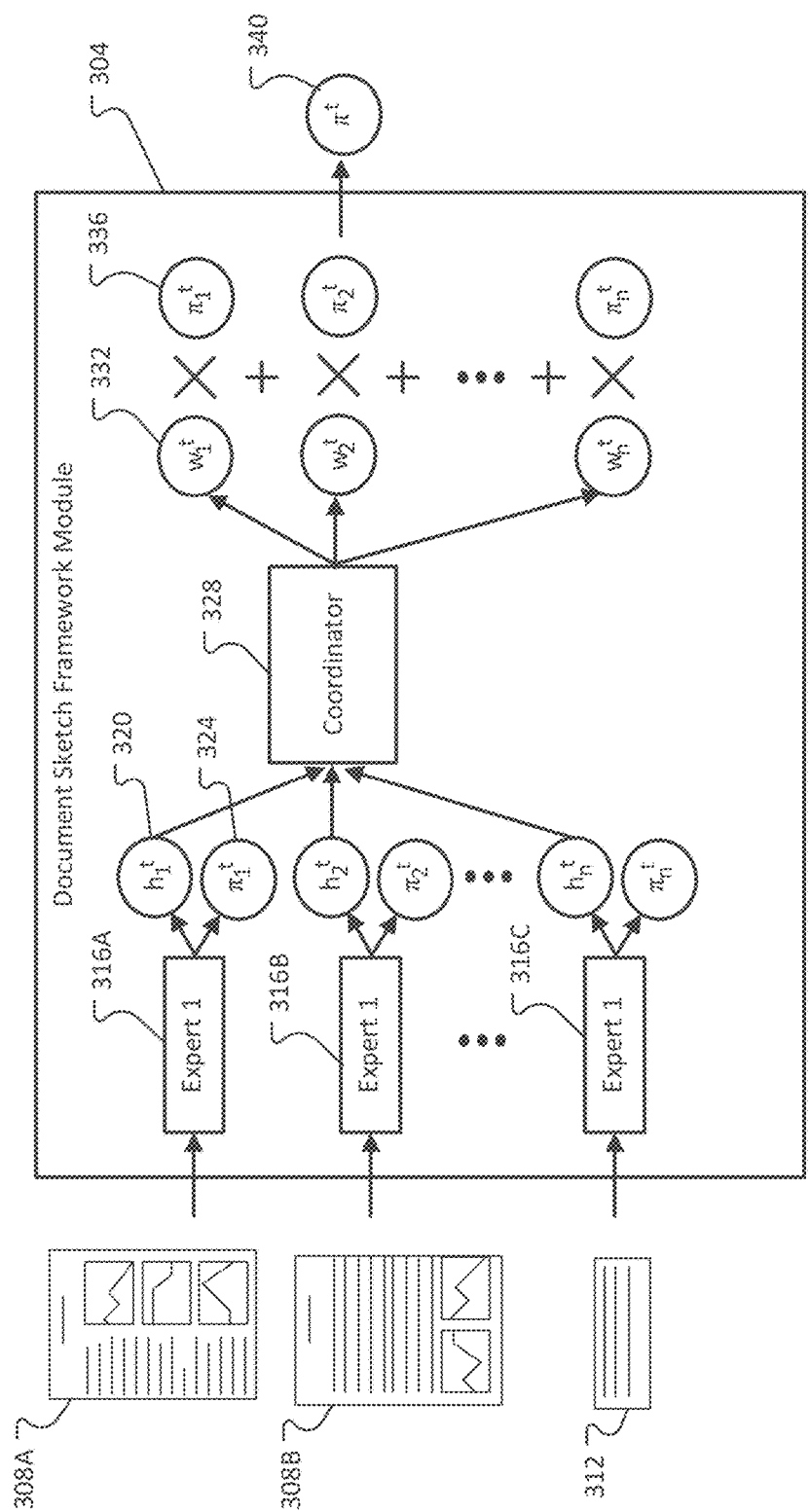
FIG. 3 depicts details of the document sketch framework module in accordance with examples of the present disclosure.

A transformer-based generation model, such as T5, may be utilized to generate a document sketch, such as the document sketch 105. As a non-limiting example, T5 is an encoder-decoder model pre-trained on a variety of text-to-text tasks that converts natural language processing problems into a text-to-text format. To leverage a transformer-based generation model, neural models may be initialized with a T5-base. As previously discussed, in order to generate an initial document sketch, the model may require multiple example documents 252. Thus, all example documents 252 may be concatenated into a single long sequence and fed into a sequence-to-sequence model, such as the T5 encoder-decoder model as previously discussed. However, processing long sequences in a self-attention based model is memory-consuming. In addition, the lack of structure makes it difficult for the model to perform document-level coordination, such as identification of reusable text portions, location of text, formatting of text, etc. In order to address the above issues, a mixture of experts (MoE) framework may be utilized, where a coordinator may decode a token at one timestamp by taking the hidden state and the output vocabulary distribution from each expert that processes a single document. As depicted in FIG. 3, additional details of the MoE framework are provided in accordance with aspects of the present disclosure is provided.

Reinforcement learning (RL) may be used to further improve the automatic scores of model predictions. More specifically, an evaluation function of an RL model may be directly optimized as depicted in Equation 2 and use a self-critical policy gradient algorithm shown to be effective in text generation. This approach explores new sequences to be generated, and compares them to a greedily decoded sequence. For each training example with input X, two output sequences are generated: ŝ, which is sampled from the probability distribution at each time step, $p(\hat{s}_t, \hat{s}_1 \ldots \hat{s}_{t-1}, X)$, and s̃, the baseline output, which is greedily generated by an arg max decoding from $p(\tilde{s}_t, \tilde{s}_1 \ldots \tilde{s}_{t-1}, X)$. The training objective is then to minimize:

$$L_{RL} = (r(\tilde{s}, Y) - r(\hat{s}, Y)) \sum_{t=1}^{T} p(\hat{s}_t | \hat{s}_1 \ldots \hat{s}_{t-1}, X) \quad (3)$$

where r(s, Y)=score(s, Y) is the sequence reward for a generated sequence s given references Y and T=|s̃|, where |s̃| is the length of vector s̃.

However, such a sequence-level reward may not be calculated until the end of generation and can lead to instability during training. Accordingly, a token-level reward may be used, where the token-level reward may be based on the incremental change to r(s, Y) from each generated token $s_t$:

$$r_t(s_t, Y) = r(s_1 \ldots t, Y) - r(s_1 \ldots t-1, Y) \quad (4)$$

and the training objective becomes:

$$L_{RL} = \sum_{t=1}^{T} -r_t(\hat{s}_t, Y) p(\hat{s}_t | \hat{s}_1 \ldots \hat{s}_{t-1}, X) \quad (5)$$

Since optimizing RL loss alone has the risk of compromising the language model, a mixed loss may be used as follows:

$$L_{MIX} = \lambda L_{RL} + (1-\lambda) L_{MLE} \quad (6)$$

where λ is a hyperparameter to be tuned.

In examples, to provide predicted text that is grounded in timely, relevant, and trusted content, grounding content may be provided to the document sketch generator 212. Such grounding content may correspond to the grounding content 256. Based on the proposed task 260, grounding content 256 may be identified, located, and/or received at the document & content receiving module 244. In examples, based on the proposed task 260, the grounding source selector 232 may identify, locate, and/or request grounding content 256. For example, if the proposed task was equal to "One of the regular monthly grain reports. Use current spreadsheet data and also pull info about the Canadian wheat harvest from Sora's mail yesterday," the grounding source selector 232 may identify a plurality of documents that correspond to "current spreadsheet data" and "info about the Canadian wheat harvest." Examples of grounding content may include but is not limited to information in one or more documents, emails, transcribed notes, spreadsheet data, PowerBI data, images, videos, speech sounds/audio files, machine states, a physical sensor reading (e.g. temperature) etc. In some instances, the grounding content may reside at a public location; in some examples, the grounding content may reside at a private location, such as but not limited to an intranet, a portal, a private collection of grounding information residing on a computing device, or other location. The grounding source selector 232 may provide the identification of the grounding content to the information retrieval model 236 such that the content 256, for example, may be retrieved and provided to the document sketch framework module 228. Accordingly, a document sketch when generated, may include timely, relevant, and/or trusted content based on the proposed task 260.

In accordance with examples of the present disclosure, a draft document editing module 220 may receive the document sketch and may present the document sketch to a user for review. In examples, the document sketch generator 212 may provide word selection criteria, such as confidence scores, associated with each text prediction region and/or each predicted text sequence such that the predicted text sequence associated with a confidence score that is below a threshold may be highlighted or otherwise identified and presented to a user for review. Accordingly, the user edit interaction module 240 may receive the confidence scores associated with each of the predicted text regions and/or predicted text sequences, and determine how text within each predicted text region should be displayed or otherwise presented to a user. As previously discussed, the predicted text regions and/or predicted text sequences having or otherwise associated with a confidence score that is below a threshold may be highlighted such that a user's attention may be directed to such distinguished portions. In some examples, where a predicted text region and/or predicted text sequence is associated with a confidence score that is below a second threshold, the user edit interaction module 240 may cause such portions to be highlighted and cause portions of predicted text regions and/or predicted text sequences associated with a confidence score above the second threshold but below the first threshold to not be highlighted or otherwise distinguished from other content in the document sketch. Accordingly, a user may first review and/or revise the predicted text regions and/or predicted text sequences having lower confidence scores before reviewing or revising other predicted text regions and/or other predicted text sequences. In some examples, once a user reviews a predicted text region and/or predicted text sequences, the document sketch may be updated/revised to reflect not only the user reviewed predicted text region and/or predicted text sequences, but also any other portion of the document sketch that was dependent upon the previously provided predicted text region and/or predicted text sequences. Thus, when a first predicted text region and/or first predicted text sequence of the document sketch is changed for example, other predicted text portions and/or predicted text sequences of the document sketch that may depend on the first predicted text region and/or predicted text sequences may be updated. In some examples, the document sketch may be automatically updated. In some examples, the document sketch may be updated at the direction of the user, for example when an indication that a control associated with a graphical user interface has been selected.

In accordance with examples of the present disclosure, the user edit interaction module 240 may allow a user to select between predicted text sequences at each text prediction region. For example, the document sketch generator 212 may generate multiple predicted text sequences for each predicted text region and cause the multiple predicted text sequences to be displayed to a user. As a non-limiting example, a user may hover or select a predicted text region of the document sketch; in response to the hover or the selection, the multiple text prediction sequences may be displayed as part of or separate from the document sketch. Such text prediction sequences may be referred to as alterative text prediction sequences. In some instances, upon selecting an alternative text prediction sequence, the user edit interaction module 240 may cause the selected alternative text prediction sequence to be displayed in the text prediction region.

In some examples, the document sketch generator 212 may generate a plurality of text prediction sequences for each text prediction region, where each text prediction sequence and/or each text prediction region includes a word selection criteria, such as a confidence score as previously described. In some instances, the text prediction sequence having a highest confidence score for an associated text prediction region may be included in an initial document sketch. In addition, as part of the document sketch and/or as referenced by the document sketch, the alternative predicted text sequences having different confidence scores may be provided to and displayed to a user. Upon selection by the user, the selected predicted text sequence may take the place of or otherwise replace the previous predicted text sequence.

In accordance with examples of the present disclosure, one or more drafts of a document sketch may be provided by the document sketch & authoring module 208. For example, upon review by a user, the document sketch & authoring module 208 may provide an initial draft to the user; upon reviewing one or more portions of the initial document sketch, the document sketch & authoring module may generate a revised document sketch utilizing the user reviewed content. In some instances, the user reviewed content may correspond to predicted text sequences that are different from the initial document sketch. Accordingly, the document sketch & authoring module 208 may generate a new document sketch and provide the new document sketch to the user as a revised document sketch 268. In some instances, when a user has reviewed the initial and/or the revised document sketch, the user may make indicate that the document sketch is final and the sketch & authoring module 208 may provide the final document sketch 272 to the user. In some instances, the different versions of the document sketch may be stored in the document & content repository 248. In some examples, the document & content repository 248 may include the grounding content 256 and the example documents 252.

FIG. 3 depicts details of the document sketch framework module 304 in accordance with examples of the present disclosure. In order to generate the document sketch, the document sketch framework module 304 may require multiple input documents, such as the input documents 308A-308B. The input documents 308A-308B may be the same as or similar to the example documents and 128 as previously discussed. In addition, an input document 312 may be provided to the document sketch framework module 304, where the input document 312 may be the same as or similar to grounding content 256. Each of the input documents 308A-308B and 312 may be concatenated into a single long sequence and fed into a sequence-to-sequence model, such as a T5 model. As previously discussed, processing long sequences in a self-attention based model is memory-consuming and the lack of structure makes it difficult for the model to perform document-level coordination.

In order to address the above issues, a mixture of experts (MoE) framework may be utilized, where a coordinator 328 decodes a token at one timestamp by taking a hidden state 320 and the output vocabulary distribution 324 from each expert (e.g., 316A-316C) that processes a single document. Each expert may have the same structure as a T5 encoder-decoder and may generate sequence s by encoding a single input document. The experts 316A-316C may share the same model parameters. At each decoding timestamp t, the $i^{th}$ expert encodes $x_i$ as well as previously decoded tokens from a coordinator 328 $s^{\sim 1} \ldots s^{\sim}_{t-1}$ (or $s_1 \ldots s_{t-1}$ during training), and outputs a probability distribution $\pi_i^t$ over all vocabulary words. The coordinator 328 may be a 12-layer transformer-encoder, with the same or similar configuration as the Bert-base encoder, and may include a transformer-based encoder that takes the hidden state at the current timestamp $h_i^t$ of each $i^{th}$ expert, and outputs a weight 332 with a final linear layer. The output weights 332 are used to calculate a weighted sum of the probability distributions 336 from their corresponding experts $\pi_t = \Sigma_{i=1}^n w_i^t \pi_i^t$, where $\pi^t$ 340 is the final distribution used to do generate a portion of the document sketch at timestamp t.

A greedy beam search may be used as the decoding strategy for generative models with the beam size of 4 for example. In order to improve the readability of output sketches, minor post-processing may be applied to models. Consecutive ellipses and uninformative tokens may be adjusted to improve readability. For example, during post-processing, consecutive ellipses may be merged if all tokens between them are among punctuation or are the top 30 frequently used tokens.

Figure 4:
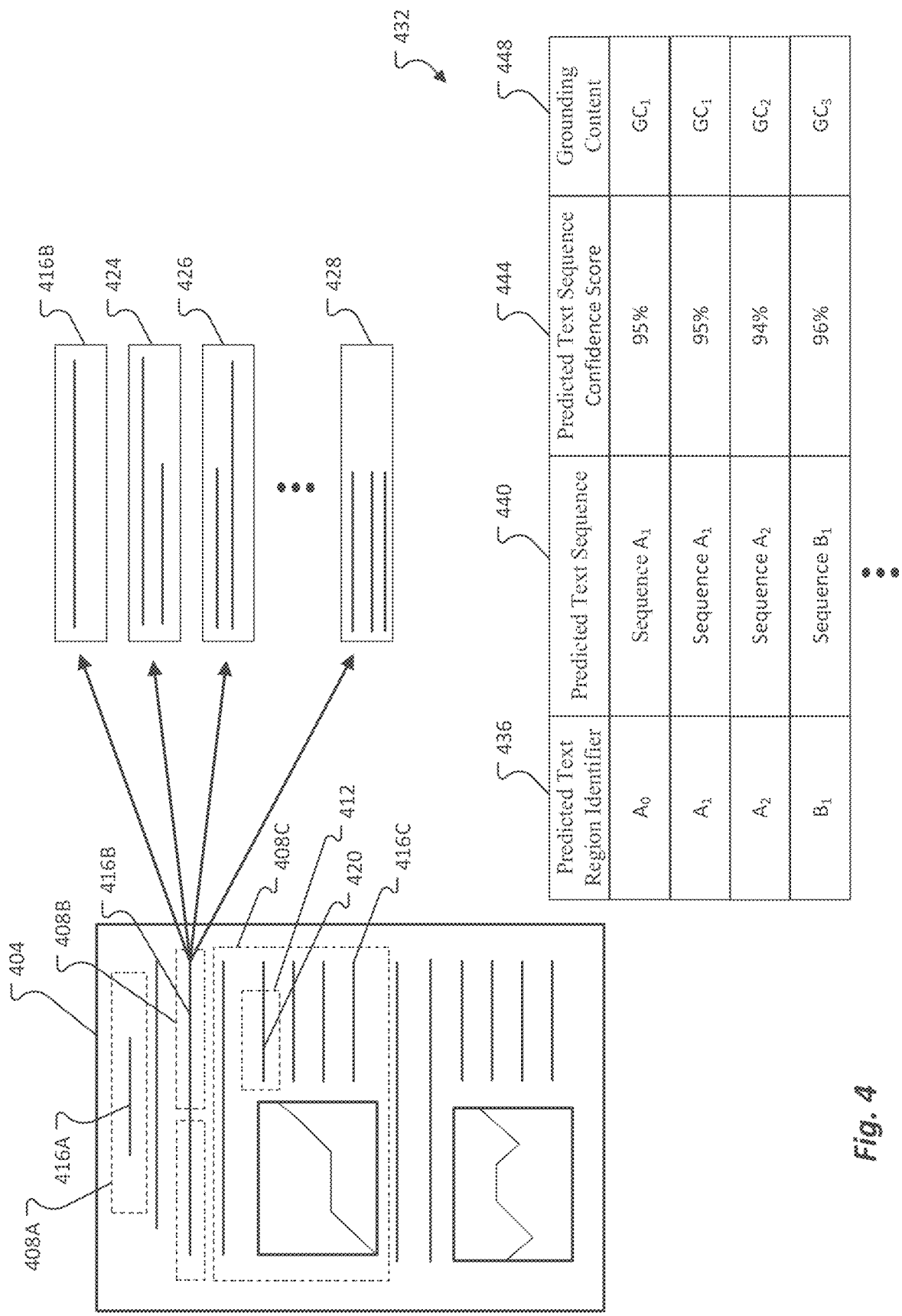
FIG. 4 depicts additional details of a document sketch and a data structure in accordance with examples of the present disclosure.
Figure 5:
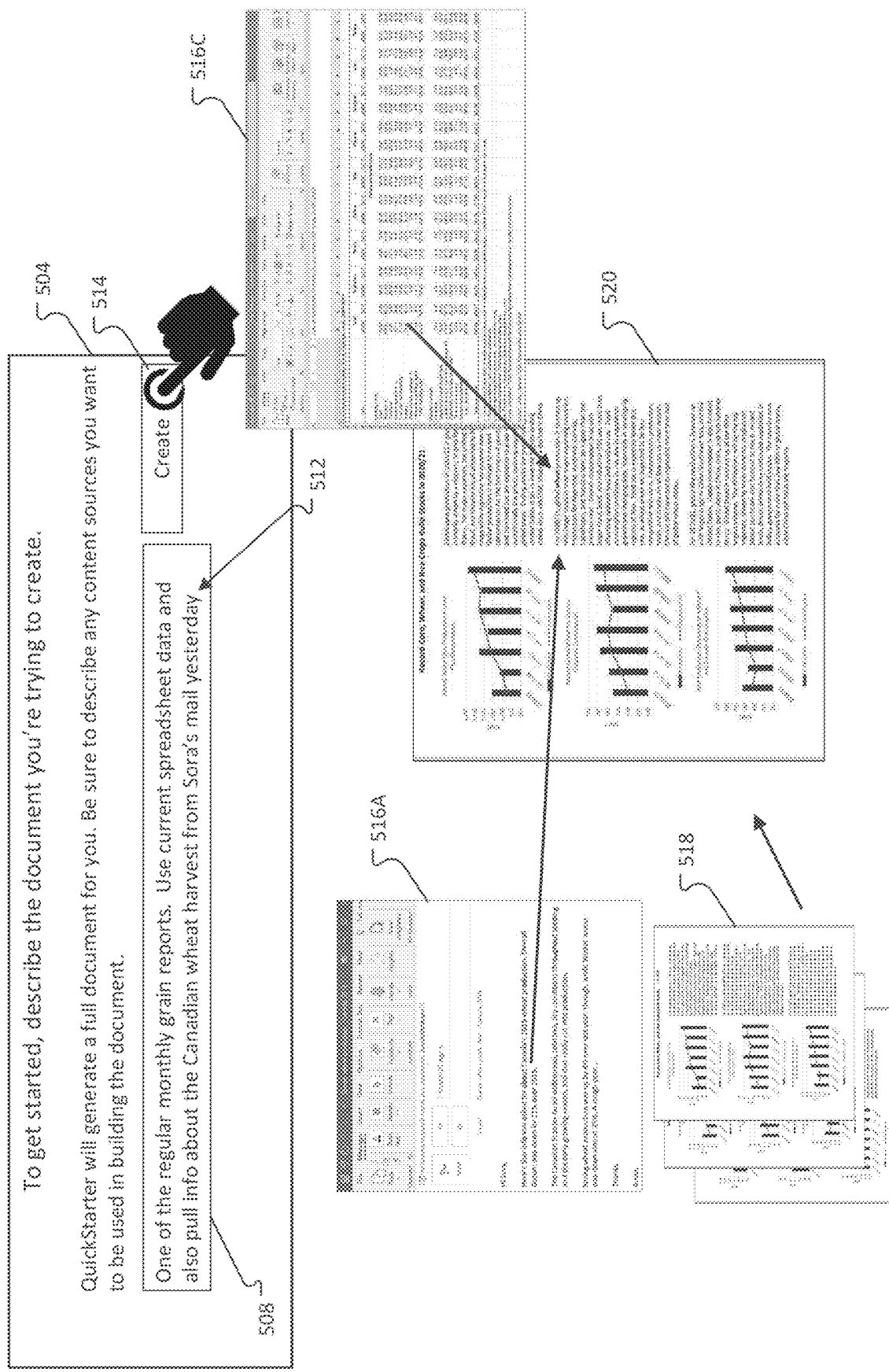

FIG. 4 depicts additional details of a document sketch 404 and a data structure 432 in accordance with examples of the present disclosure. The document sketch 404 may comprise regions including, but not limited to predicted text regions 408A, 408B, and 408C. Each of predicted text regions may include content, such as but not limited to predicted text sequences. For example, the predicted text region 408A may include content 416A corresponding to a predicted text sequence that is a title of the document sketch 404. In some example, the content 416A may include not only text, but also formatting information such as but not limited to font, spacing, size, and location. As another example, the predicted text region 408B may include content 416B corresponding to a predicted text sequence that is a portion of a sentence or line. In some examples, a predicted text region may include one or more predicted text regions and/or one or more predicted text sequences. For example, the predicted text region 408C may include the predicted text region 412 including content 420 corresponding to a predicted text sequences. In addition, the predicted text region 408C may include content 416C corresponding to a predicted text sequence. In some examples, the predicted text regions may be referred to as a content portion of the document. That is, the predicted text region 408C may refer to a content portion that includes content other than predicted text. For example, the predicted text region 408C may include a graph, where the graph may be generated and/or be generated based on grounding content. In some examples, the predicted text region 408C may include, an image, text formatted ins a specific manner, and/or media content.

In examples, each of the predicted text regions of the document sketch may include one or more alterative content structures and/or alternative predicted text sequences. For example, the predicted text region 408B may include content 416B corresponding to a predicted text sequence. In addition, the predicted text region 408B may reference or otherwise include an alternative content structure 424, alternative content structure 426, and/or alternative content structure 428 for example. In accordance with some examples, the predicted text sequences, including the alternative predicted text sequences, may be associated with a corresponding confidence score as previously described. Thus, a data structure 432 may include a predicted text region identifier 436, a predicted text sequence 440, a predicted text sequence confidence score 444, and associated grounding content 448, where the predicted text region identifier 436 may include and identifier identifying the predicted text region, the predicted text sequence 440 includes the predicted text sequence, the predicted text sequence confidence score 444 includes a confidence score associated with the predicted text sequence 440 and/or the predicted text region identifier 436, and the grounding content 448 includes an identifier associated with the grounding content used to generate the predicted text sequence. In examples, an identifier may identify a currently selected or otherwise displayed predicted text region and/or predicted text sequence that is included in the document sketch. For example, an identifier $A_0$ may indicate the current predicted text sequence included in the document sketch.

FIGS. 5-8 depict examples directed to co-authoring one or more document sketches in accordance with examples of the present disclosure. More specifically, a prompt 504 may be presented to a user initiating a co-authoring document process. The prompt 504 may include a text control 508 configured to receive text from a user. The text from the user, for example 512, may correspond to a proposed task, such as the proposed task 103. Upon selection of the create control 514, the draft document assistant module 108 may receive the proposed task 103, identify grounding content 516A and 516B, identify example documents 518, and generate a document sketch 520. As previously discussed, a format of the document sketch 520 may be generated from a plurality of example documents 518. In addition, the document sketch 520 may include one or more regions that are based on the grounding content 516A and 516B. Accordingly, the document sketch 520 serving as a target document may provide a user with a starting point for generating a document.

As depicted in FIG. 6, a user may select an area of a document sketch 604 corresponding a predicted text sequence 612. Upon selecting the predicted text sequence 612, a window or prompt 620 may be displayed, where the window or prompt 620 may include alternative predicted text sequences 628 and 632. In some instances, a user may select a control 640 to display additional alternative predicted text sequences. The alternative predicted text sequences may be generated based on the same grounding content. In some examples, the alternative predicted text sequences may be generated based on different grounding content. In some examples, a user may select a predicted text sequences, such as predicted text sequence 624 for example; the draft document assistance module 108 may cause the predicted text sequence 612 to be replaced with the selected predicted text sequence 624. In some examples, the window or prompt 620 may provide a preview functionality; that is, a user may select a control 608 such that a preview of the selected predicted text sequence 624 may appear in the document sketch 604.

As further illustrated in FIG. 6, predicted text sequences may be distinguished from each other; for example, the predicted text sequence 612 may be highlighted or include text of a certain color. The predicted text sequence 606 may be underlined using a first underlining type while a predicted text sequence 607 may be underlined using a second underlining type. In examples, the manner in which the predicted text sequences are distinguished from one another may be in accordance with a corresponding confidence score. For example, a color of text associated with a first confidence score may be different than a color of text associate with a second confidence score.

In accordance with examples of the present disclosure, the grounding content may be displayed to a user upon selection of a predicted text sequence. For example, and as depicted in FIG. 7, a user may select a predicted text sequence 708. In some example, the selection mechanism of the predicted text sequence 708 to display the grounding content associated with the predicted text sequence may be different from the selection mechanism to display alternative predicted text sequences. For example, a user may double click 712 a predicted text sequence 708 causing a window or a prompt 716 including the underlying grounding content 720 to be displayed. In some examples, the window or prompt 716 may correspond to a window or prompt associated with one or more productivity applications, such as word processors, spreadsheets, and the like. In some examples, the window or prompt 716 may allow a user to edit the grounding content such that a revision of the document sketch may include the edited grounding content. In some examples, the window or prompt 716 serves as an information only; accordingly, the window or prompt 716 may display an image of the grounding content, and/or may be a link to a source of grounding content for example. In some examples, the underlying data may identify what portion of the selected predicted text sequence is based on example documents and what portion of the selected text is based on grounding information, for example form an email.

As depicted in FIG. 8, a window or prompt associated with grounding content of alternative predicted text sequences may be displayed to a user in accordance with examples of the present disclosure. For example, a document sketch 804 may provide a predicted text sequence 808 that is selected by the user with a single click 812. In examples, a window or prompt 816 displaying alternative predicted text sequences may be displayed. A user may then select an alternative predicted text sequence, such as the alternative predicted text sequence 820, via a double-click thereby causing a window or prompt 828 to be displayed. The window or prompt 828 may include the grounding content 832 that is specific the selected alternative predicted text sequence 820.

Figure 9:
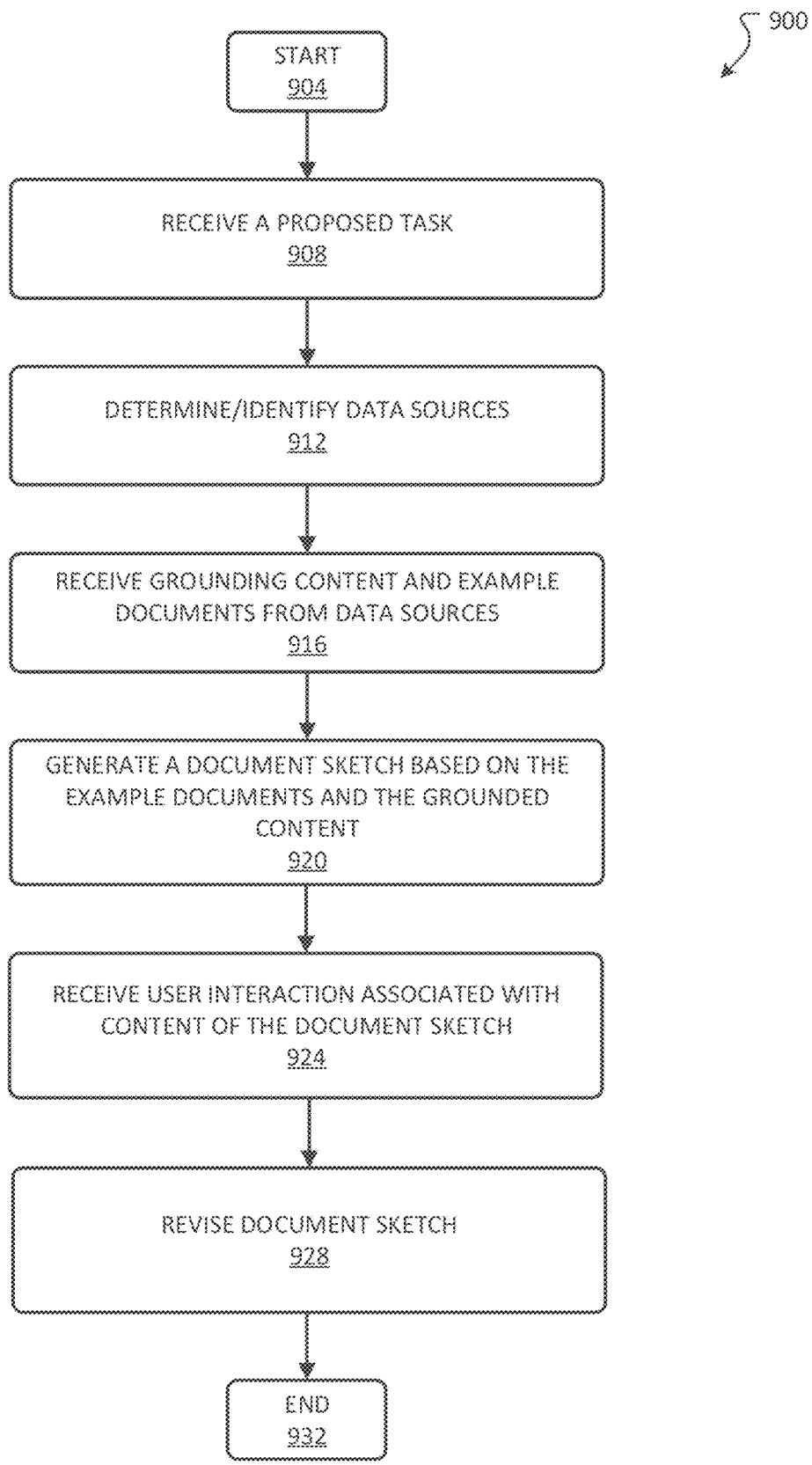
FIG. 9 illustrates an overview of an example method for generating a document sketch in accordance with examples of the present disclosure.

FIG. 9 depicts an example method 900 for generating a document sketch in accordance with examples of the present disclosure. A general order for the steps of the method 900 is shown in FIG. 9. Generally, the method 900 starts at 902 and ends at 932. The method 900 may include more or fewer steps or may arrange the order of the steps differently than those shown in FIG. 9. The method 900 can be executed as a set of computer-executable instructions executed by a computer system and encoded or stored on a computer readable medium. Further, the method 900 can be performed by gates or circuits associated with a processor, Application Specific Integrated Circuit (ASIC), a field programmable gate array (FPGA), a system on chip (SOC), graphics processing unit (GPU), or other hardware device. Hereinafter, the method 900 shall be explained with reference to the systems, components, modules, software, data structures, user interfaces, etc. described in conjunction with FIGS. 1-8.

The method 900 begins at operation 904, where a graphical user interface including a prompt or window may be displayed to a user. The method 900 may proceed to operation 908, where a proposed task may be received at the window or prompt. For example, a user may enter a proposed task of "One of the regular monthly grain reports. Use current spreadsheet data and also pull info about the Canadian wheat harvest from Sora's mail yesterday." Accordingly, the method 900 may proceed to operation 912, where data sources for generating a document sketch may be determined and/or identified. For example, a plurality of documents that are determined to be "one of the regular monthly grain reports" may be identified. In non-limiting examples, one or more documents may include a label indicating that it is a monthly grain report, may be located in a file or folder attributed with monthly grain reports, or the content of such document may be analyzed and determined to be a monthly grain report based on the content. In some examples, a clustering algorithm may be utilized to determine documents to be used as an example document. For example, based on an example document, additional similar example documents may be identified and retrieved based on a cluster analysis. Such document clustering analysis may include, but is not limited to a k-means clustering, brown clustering, and/or clustering based on term frequency and inverse document frequency. In some instances, the example documents may be the same as or similar to the previously described example documents 252 and may reside at a public location or private location. In addition, grounding content may be determined and/or identified. In examples, if the proposed task was equal to "One of the regular monthly grain reports. Use current spreadsheet data and also pull info about the Canadian wheat harvest from Sora's mail yesterday," the a plurality of documents that correspond to "current spreadsheet data" and "info about the Canadian wheat harvest" may be identified and/or determined. Examples of grounding content may include but is not limited to information in one or more documents, emails, transcribed notes, spreadsheet data, PowerBI data etc. In some instances, the grounding content may reside at a public or private location. The grounding content may be the same as or similar to the grounding content 256 previously described.

The method 900 may proceed to operation 916 where example documents and grounding content may be received.

For example, a source document selector 224 may receive example documents and grounding content may be retrieved by an information retrieval model 236 based on the identified grounding content sources. The method 900 may then proceed to 920 where a document sketch may be generated. In examples, the document sketch may be based on the example documents and the grounding content. For example, the example documents may provide reusable text, format, and structure to the document sketch. The grounding content may provide timely, relevant, and trusted content to the document sketch. In examples, the example documents and the grounding content may be provided to a document sketch framework module, for example the document sketch framework module 304. Each of the input documents may be concatenated into a single long sequence and fed into a sequence-to-sequence model, such as a T5 model. In examples, a coordinator, such as the coordinator 328, decodes a token at one timestamp by taking a hidden state and the output vocabulary distribution from each expert that processes a single document. Each expert may have the same structure as a T5 encoder-decoder and may generate a sequence s by encoding a single input document. At each decoding timestamp t, the $i^{th}$ expert encodes $x_i$ as well as previously decoded tokens from a coordinator $\tilde{s}_1 \ldots \tilde{s}_{t-1}$, and outputs a probability distribution $\pi_i^t$ over all vocabulary words. The coordinator may include a transformer-based encoder that takes the hidden state at the current timestamp $h_i^t$ of each $i^{th}$ expert, and outputs a weight with a final linear layer. The output weights are used to calculate a weighted sum of the probability distributions from their corresponding experts $\pi_t = \Sigma_{i=1}^n w_i^t \pi_i^t$, where $\pi^t$ is the final distribution used to do generate a predicted text sequence of the document sketch at timestamp t. In some examples, to improve the readability of output sketches, minor post-processing may be applied via the models.

Once the document sketch has been generated, the method 900 may proceed to operation 924, where a user interaction associated with the content of the document sketch may be received. For example, a user may select a predicted text sequence from a plurality of predicted text sequences. In response to the selected predicted text sequence, a window or prompt may be displayed to the user; the window or prompt may include one or more alternative predicted text sequences of which the user may select to replace a predicted text sequence included in the document sketch. Accordingly, if a user selects an alternative predicted text sequence, a revised document sketch may be generated at 928. In some examples, the revised document sketch may be the same as or similar to the document sketch provided at 920; however, the revised document sketch may include the alternative predicted text sequence selected by the user. The method 900 may end at 932.

Figure 10:
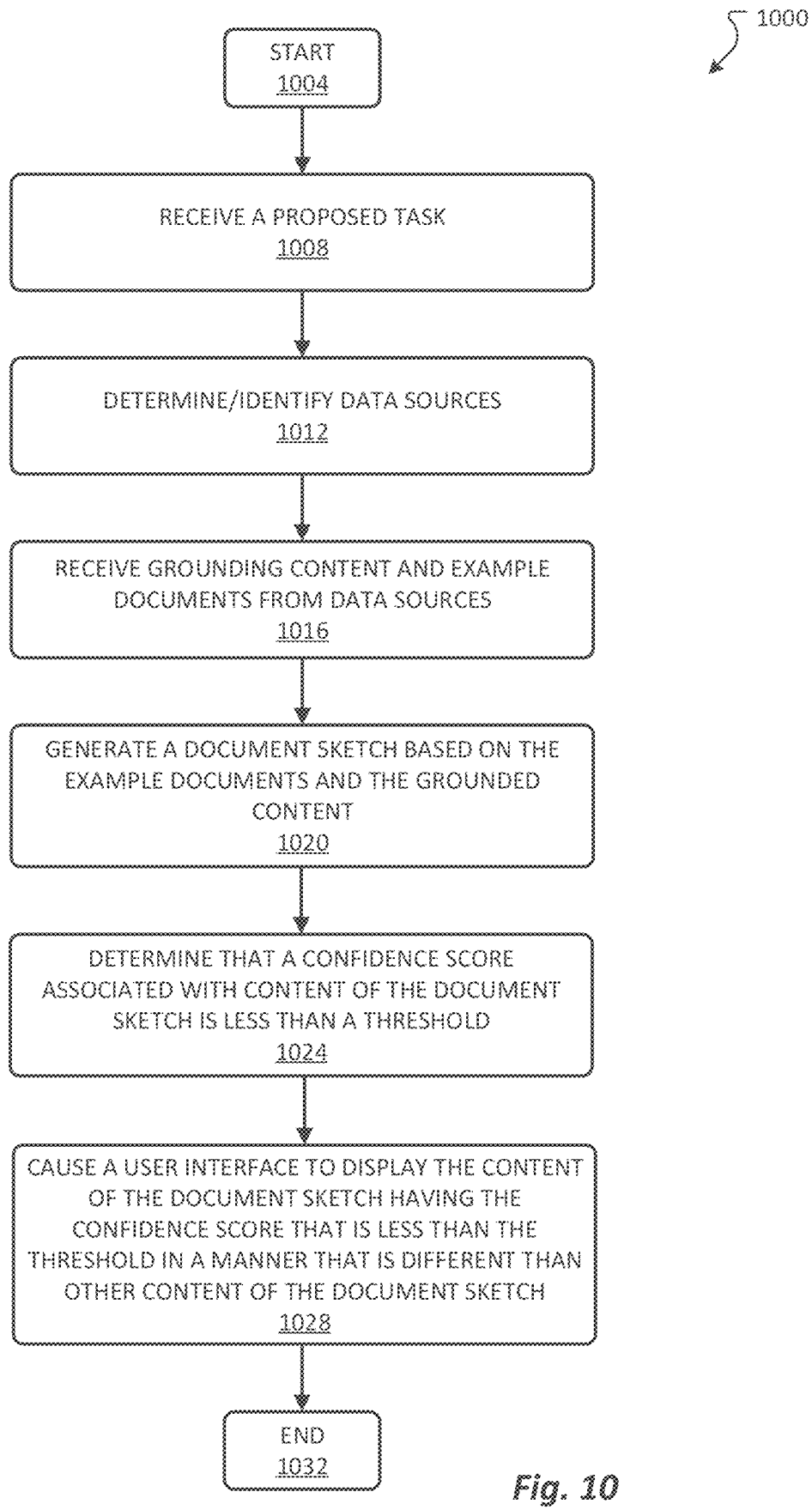
FIG. 10 illustrates an overview of an example method for generating a document sketch in accordance with examples of the present disclosure.

FIG. 10 depicts an example method 1000 for generating a document sketch in accordance with examples of the present disclosure. A general order for the steps of the method 1000 is shown in FIG. 10. Generally, the method 1000 starts at 1004 and ends at 1032. The method 1000 may include more or fewer steps or may arrange the order of the steps differently than those shown in FIG. 10. The method 1000 can be executed as a set of computer-executable instructions executed by a computer system and encoded or stored on a computer readable medium. Further, the method 1000 can be performed by gates or circuits associated with a processor, Application Specific Integrated Circuit (ASIC), a field programmable gate array (FPGA), a system on chip (SOC), graphics processing unit (GPU), or other hardware device. Hereinafter, the method 1000 shall be explained with reference to the systems, components, modules, software, data structures, user interfaces, etc. described in conjunction with FIGS. 1-9.

The method 1000 begins at operation 1004, where a graphical user interface including a prompt or window may be displayed to a user. The method 1000 may proceed to operation 1008, where a proposed task may be received at the window or prompt. For example, a user may enter a proposed task of "One of the regular monthly grain reports. Use current spreadsheet data and also pull info about the Canadian wheat harvest from Sora's mail yesterday." Accordingly, the method 1000 may proceed to operation 1012, where data sources for generating a document sketch may be determined and/or identified. For example, a plurality of documents that are determined to be "one of the regular monthly grain reports" may be identified. In non-limiting examples, one or more documents may include a label indicating that it is a monthly grain report, may be located in a file or folder attributed with monthly grain reports, or the content of such document may be analyzed and determined to be a monthly grain report based on the content. In some examples, a clustering algorithm may be utilized to determine documents to be used as an example document. For example, based on an example document, additional similar example documents may be identified and retrieved based on a cluster analysis. Such document clustering analysis may include, but is not limited to a k-means clustering, brown clustering, and/or clustering based on term frequency and inverse document frequency. In some instances, the example documents may be the same as or similar to the previously described example documents 252 and may reside at a public location or private location. In addition, grounding content may be determined and/or identified. In examples, if the proposed task was equal to "One of the regular monthly grain reports. Use current spreadsheet data and also pull info about the Canadian wheat harvest from Sora's mail yesterday," the a plurality of documents that correspond to "current spreadsheet data" and "info about the Canadian wheat harvest" may be identified and/or determined. Examples of grounding content may include but is not limited to information in one or more documents, emails, transcribed notes, spreadsheet data, PowerBI data etc. In some instances, the grounding content may reside at a public or private location. The grounding content may be the same as or similar to the grounding content 256 previously described.

The method 1000 may proceed to operation 1016 where example documents and grounding content may be received. For example, a source document selector 224 may receive example documents and grounding content may be retrieved by an information retrieval model 236 based on the identified grounding content sources. The method 1000 may then proceed to 1020 where a document sketch may be generated. In examples, the document sketch may be based on the example documents and the grounding content. For example, the example documents may provide reusable text, format, and structure to the document sketch. The grounding content may provide timely, relevant, and trusted content to the document sketch. In examples, the example documents and the grounding content may be provided to a document sketch framework module, for example the document sketch framework module 304. In examples, a document sketch may be generated in a similar manner as in step 920 of method 900. Once the document sketch has been generated, the method 1000 may proceed to operation 1024, where confidence scores associated with content of the document sketch may be identified and compared to a threshold. In some examples, the content may correspond to a predicted text sequence, a predicted text region, or another portion of the document sketch that was automatically generated. The confidence score may be retrieved from a data structure, such as the data structure 432 of FIG. 4. The method 1000 may proceed to operation 1028 where if the confidence score is less than a threshold confidence score, the predicted text sequence in the predicted text region may be differentiated from other content, such as other predicted text regions and/or other predicted text sequence, within the document sketch. As previously discussed, the confidence score may be associated with a predicted text sequence and/or the predicted text region in which the predicted text sequence resides. For example, the predicted text region may include content, such as a predicted text sequence, that is generated by a draft document assistance module, such as the draft document assistance module 108. In some examples, the predicted text sequence in the predicted text region having a confidence score that is less than a threshold may be highlighted, italicized, underlined, tagged, or may be set apart from other content in the document sketch in a similar manner. Accordingly, a user's attention may be directed to such areas for review. The method 1000 may end at 1032.

Figure 11:
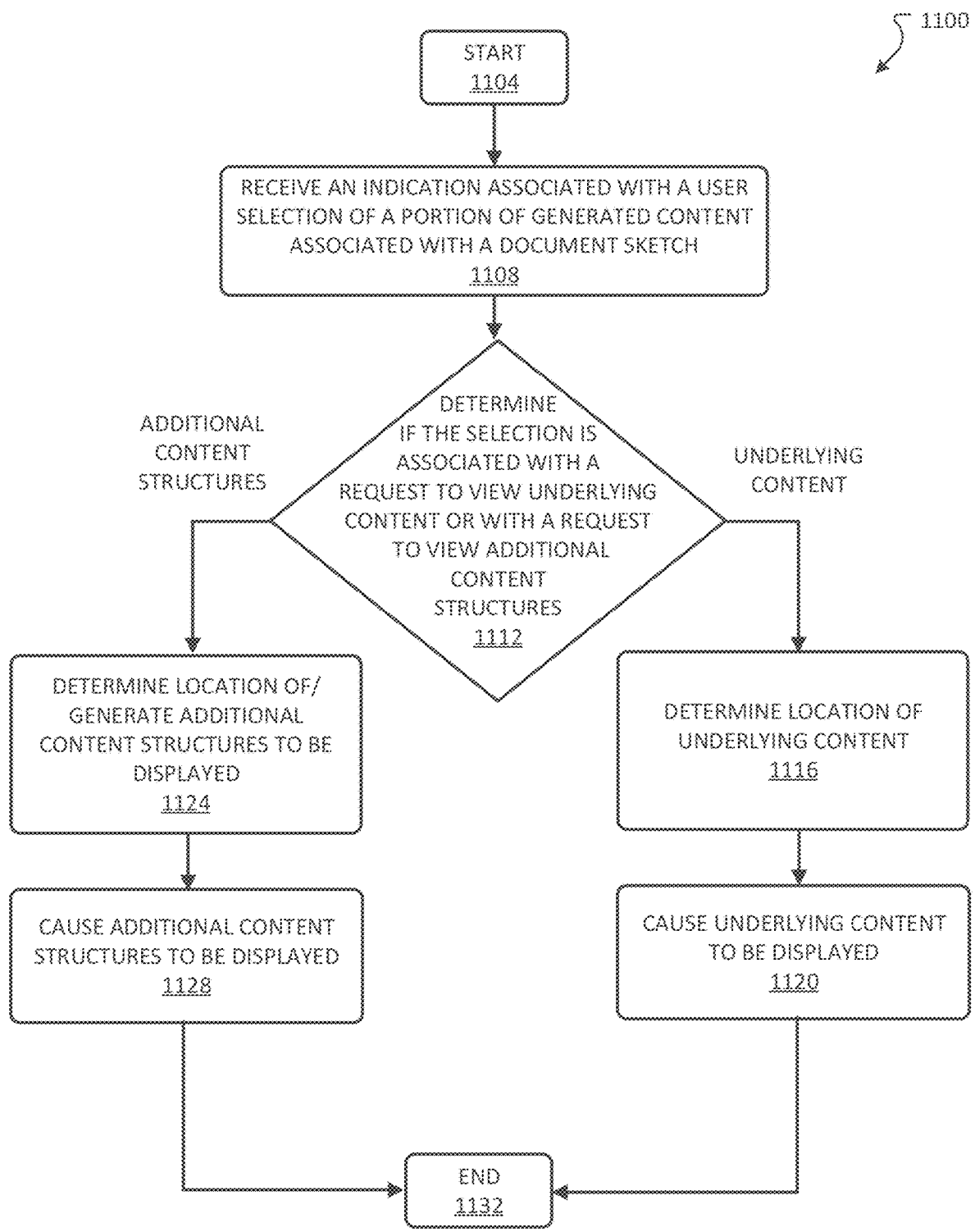
FIG. 11 illustrates an overview of an example method for displaying additional information associated with a document sketch.

FIG. 11 depicts an example method 1100 for surfacing additional information about a predicted text sequence in accordance with examples of the present disclosure. A general order for the steps of the method 1100 is shown in FIG. 11. Generally, the method 1100 starts at 1104 and ends at 1132. The method 1100 may include more or fewer steps or may arrange the order of the steps differently than those shown in FIG. 11. The method 1100 can be executed as a set of computer-executable instructions executed by a computer system and encoded or stored on a computer readable medium. Further, the method 1100 can be performed by gates or circuits associated with a processor, Application Specific Integrated Circuit (ASIC), a field programmable gate array (FPGA), a system on chip (SOC), graphics processing unit (GPU), or other hardware device. Hereinafter, the method 1100 shall be explained with reference to the systems, components, modules, software, data structures, user interfaces, etc. described in conjunction with FIGS. 1-10.

The method 1100 begins at operation 1104, where an interaction at a graphical user interface may occur; the method may proceed to operation 1108 where an indication of such interaction is received. In instances where the interaction is directed toward a portion of generated content of a sketch document, the indication may identify a portion of the document sketch that was selected. For example, the indication may be associated with a predicted text sequence or predicted text region identifier as discussed with respect to the data structure of FIG. 4. The method may proceed to operation 1112 where a determination may be made as to whether the selection is associated with a request to view underlying data such as grounding content or if the selection is associated with a request to view additional content structures, such as but not limited to alternative predicted text sequences. In some examples, the determination may be based on the indication that is received at 1108. For example, an indication associated with a double-click operation made by a user may indicate that the user desires to view underlying content, such as the grounding content associated with the portion of generated content. In other example, the indication may be associated with the selection of a menu item appearing based on a right-click operation. As such, the method 1100 may proceed to 1116. As another example, an indication associated with a single-click operation made by a user may indicate that the user desires to view additional content structures associated with the selected portion of generated content. For example, a single-click operation may indicate that the user desires to view alternative predicted text sequences associated with the selected portion of generated content. In other example, the indication may be associated with the selection of a menu item appearing based on a right-click operation. As such the method 1100 may proceed to operation 1124.

At operation 1116, a location of underlying content associated with the selected portion of generated content may be determined. For example, based on an identifier of the selected portion of content, underlying content, such as grounding information of which the selected portion of content was based may be identified. Accordingly, the method 1100 may proceed to operation 1120 where a prompt or window may be displayed at a graphical user interface; the prompt or window may include the underlying content. In examples, the prompt or window may be an application window displaying the underlying content. In examples, one or more prompts or windows displaying different underlying content may be displayed.

In examples where the selection of the portion of generated content is associated with a request to view additional content structures, the method 1100 may proceed from 1112 to 1124, where a location of the additional content structures may be identified. In some examples, the additional content structures may exist and may be associated with the identifier for the predicted text region and/or predicted text sequence. In other examples, the additional content structures may be generated upon the selection of the portion of generated content. Accordingly, the method 1100 may proceed to operation 1128 where a prompt or window may be displayed at a graphical user interface. The prompt or window may include additional content structures, such as but not limited to alternative text prediction sequences. The method 1100 may end at 1132.

Figure 12:
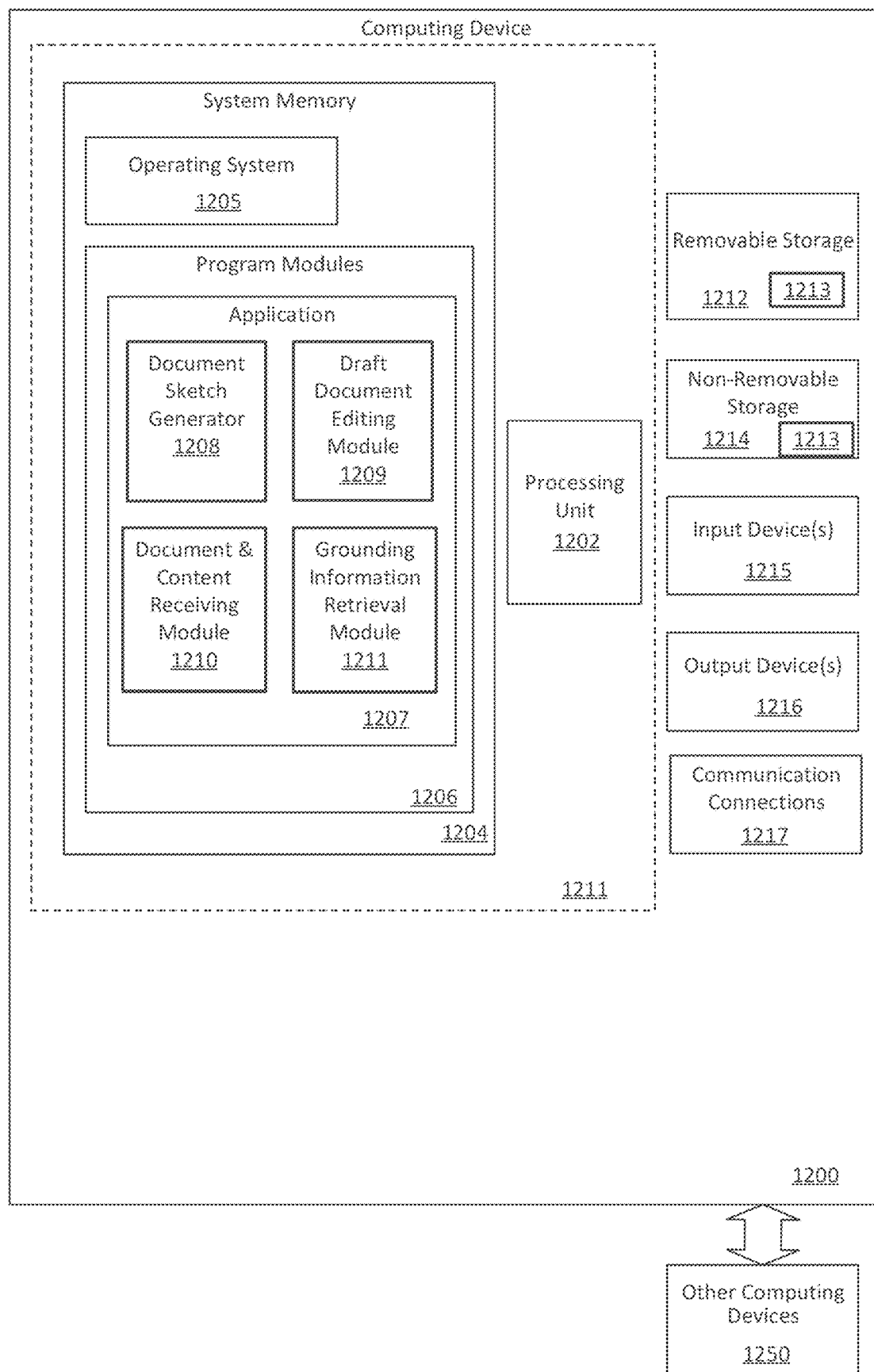
FIG. 12 is a block diagram illustrating physical components (e.g., hardware) of a computing device with which aspects of the disclosure may be practiced.
Figure 13A:
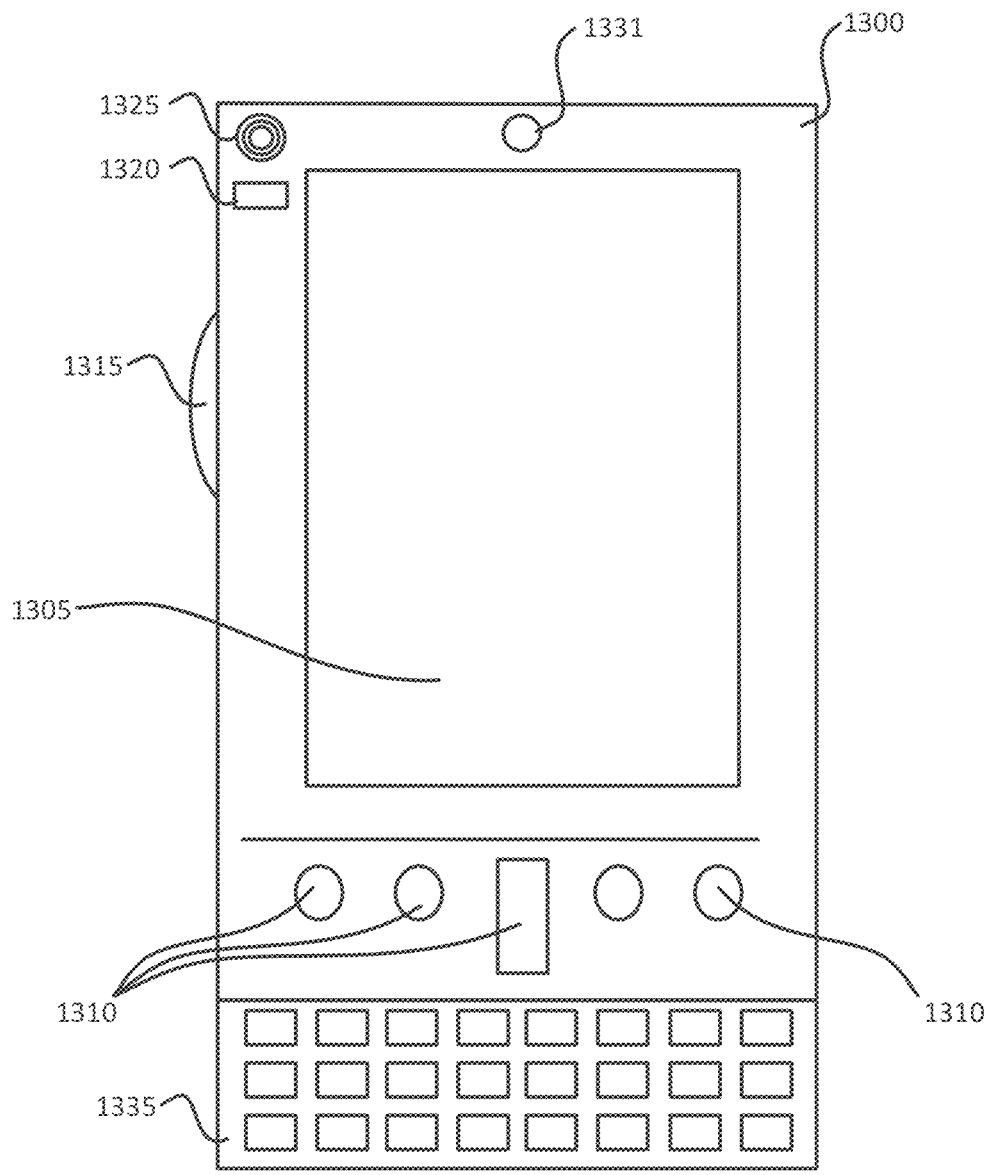
FIGS. 13A-13B illustrate a mobile computing device with which embodiments of the disclosure may be practiced.
Figure 13B:
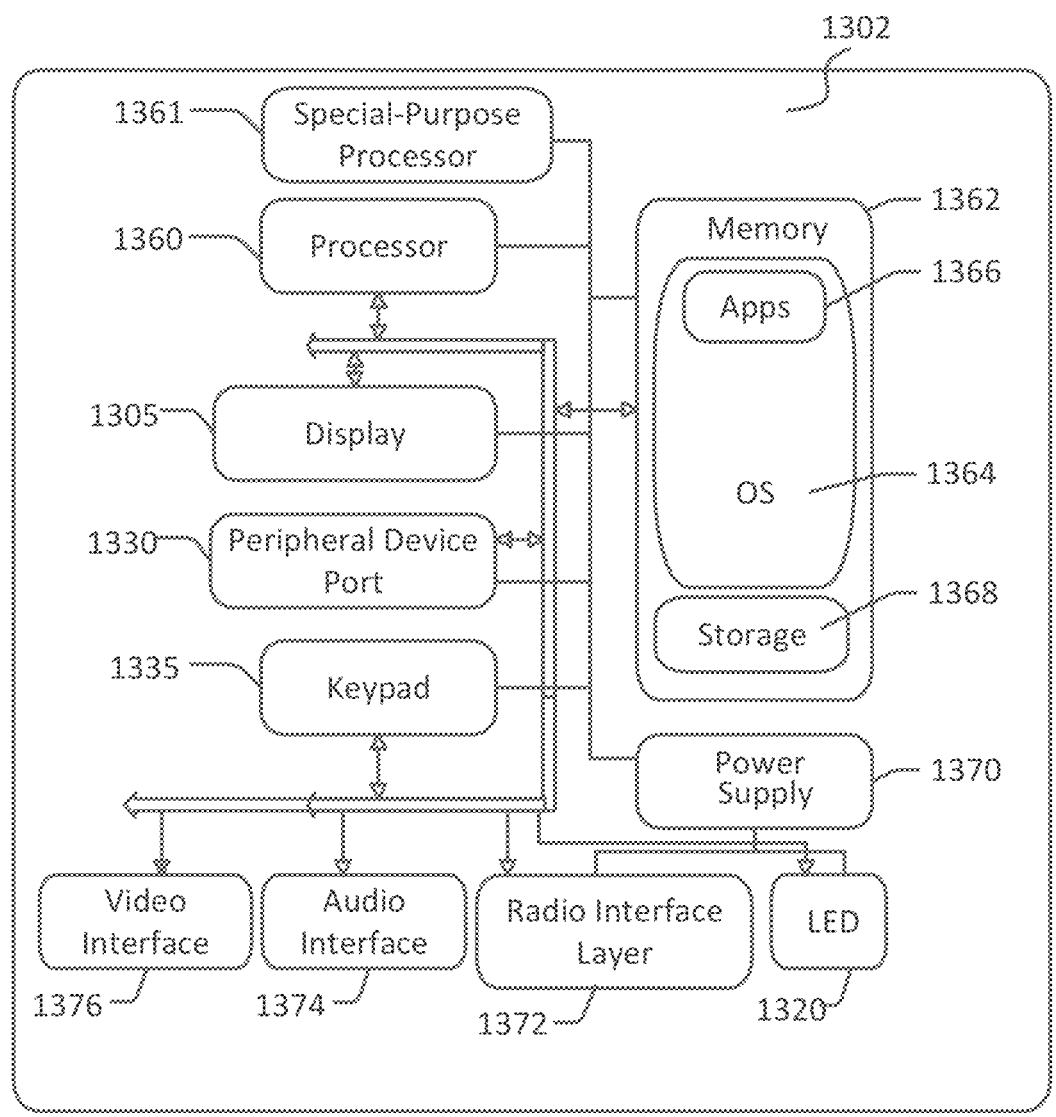
Figure 14:
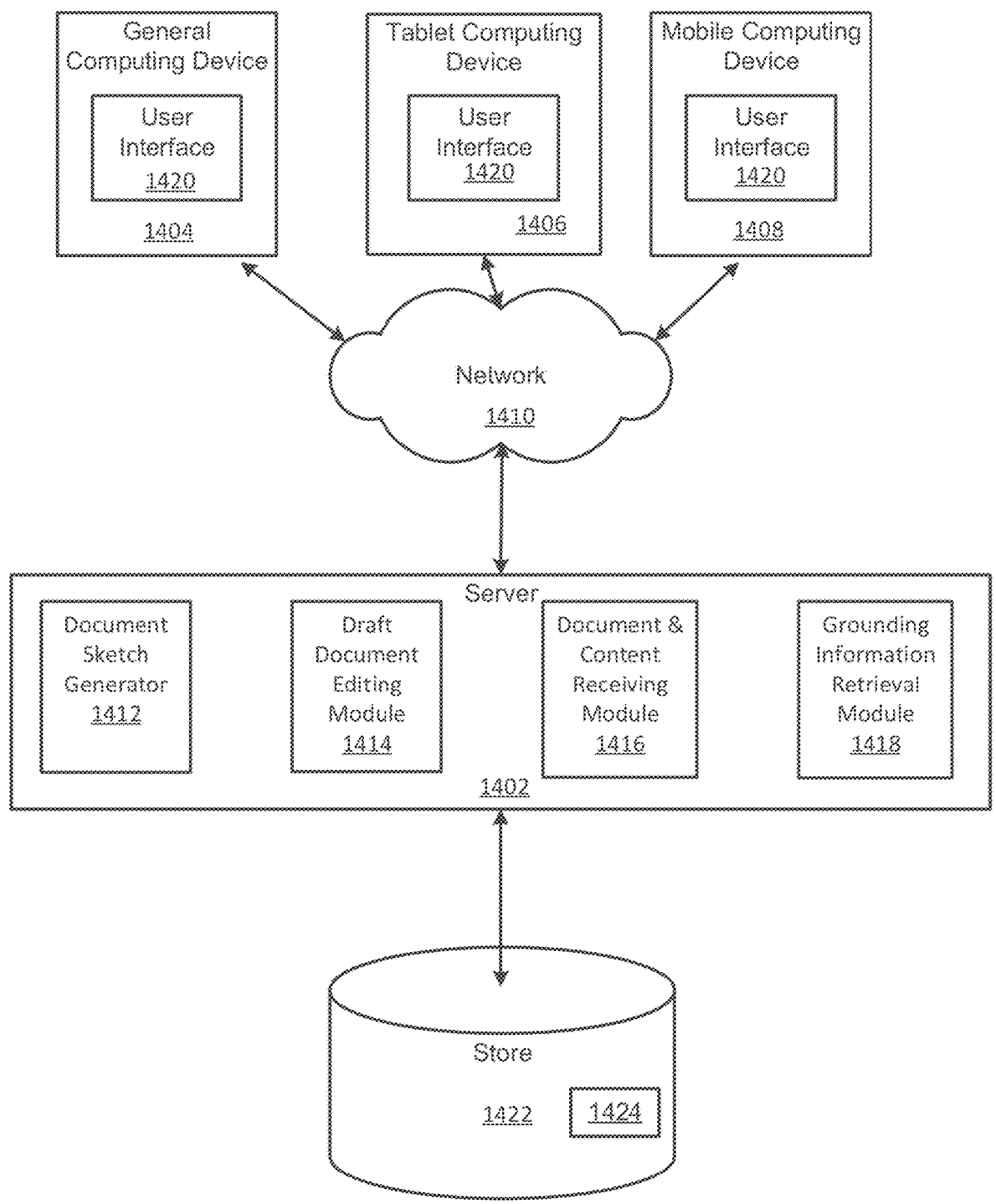
FIG. 14 illustrates one aspect of the architecture of a system for processing data.

FIGS. 12-14 and the associated descriptions provide a discussion of a variety of operating environments in which aspects of the disclosure may be practiced. However, the devices and systems illustrated and discussed with respect to FIGS. 12-14 are for purposes of example and illustration and are not limiting of a vast number of computing device configurations that may be utilized for practicing aspects of the disclosure, described herein.

FIG. 12 is a block diagram illustrating physical components (e.g., hardware) of a computing device 1200 with which aspects of the disclosure may be practiced. The computing device components described below may be suitable for the computing and/or processing devices described above. In a basic configuration, the computing device 1200 may include at least one processing unit 1202 and a system memory 1204. Depending on the configuration and type of computing device, the system memory 1204 may comprise, but is not limited to, volatile storage (e.g., random-access memory (RAM)), non-volatile storage (e.g., read-only memory (ROM)), flash memory, or any combination of such memories.

The system memory 1204 may include an operating system 1205 and one or more program modules 1206 suitable for running software application 1207, such as one or more components supported by the systems described herein. As examples, system memory 2904 may include the document sketch generator 1208, the document & content receiving module 1210, the draft document editing module 1209, and the information retrieval module 236. The document sketch generator 1208 may be the same as or similar to the document sketch generator 212 previously described; the document & content receiving module 1210 may be the same as or similar to the document & content receiving module 244 as previously described; the draft document editing module 1209 may be the same as or similar to the draft document editing module 220 as previously described; and the grounding information retrieval module 216 may be the same as or similar to the grounding information retrieval module 1211 as previously described. The operating system 2905, for example, may be suitable for controlling the operation of the computing device 1200.

Furthermore, embodiments of the disclosure may be practiced in conjunction with a graphics library, other operating systems, or any other application program and is not limited to any particular application or system. This basic configuration is illustrated in FIG. 12 by those components within a dashed line 1211. The computing device 1200 may have additional features or functionality. For example, the computing device 1200 may also include additional data storage devices (removable and/or non-removable) such as, for example, magnetic disks, optical disks, or tape. Such additional storage is illustrated in FIG. 12 by a removable storage device 1212 and a non-removable storage device 1214. In examples, the document & content repository 1213, which may be the same as or similar to the document & content repository 248, may reside at one or more of the removable storage device 1212 and/or the non-removable storage device 1214.

As stated above, a number of program modules and data files may be stored in the system memory 1204. While executing on the processing unit 2902, the program modules 1206 (e.g., application 1207) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 12 may be integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols may be operated via application-specific logic integrated with other components of the computing device 1200 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 1200 may also have one or more input device(s) 1215 such as a keyboard, a mouse, a pen, a sound or voice input device, a touch or swipe input device, etc. The output device(s) 1216 such as a display, speakers, a printer, etc. may also be included. The aforementioned devices are examples and others may be used. The computing device 1200 may include one or more communication connections 1217 allowing communications with other computing devices 1250. Examples of suitable communication connections 1217 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable, and non-removable media implemented in any method or technology for storage of information, such as computer readable instructions, data structures, or program modules. The system memory 1204, the removable storage device 1212, and the non-removable storage device 1214 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 1200. Any such computer storage media may be part of the computing device 1200. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 13A-13B illustrate a mobile computing device 1300, for example, a mobile telephone, a smart phone, wearable computer (such as a smart watch), a tablet computer, a laptop computer, and the like, with which embodiments of the disclosure may be practiced. In some respects, the client may be a mobile computing device. With reference to FIG. 13A, one aspect of a mobile computing device 1300 for implementing the aspects is illustrated. In a basic configuration, the mobile computing device 1300 is a handheld computer having both input elements and output elements. The mobile computing device 1300 typically includes a display 1305 and one or more input buttons 1310 that allow the user to enter information into the mobile computing device 1300. The display 1305 of the mobile computing device 1300 may also function as an input device (e.g., a touch screen display).

If included, an optional side input element 1315 allows further user input. The side input element 1315 may be a rotary switch, a button, or any other type of manual input element. In alternative aspects, mobile computing device 1300 may incorporate greater or fewer input elements. For example, the display 1305 may not be a touch screen in some embodiments.

In yet another alternative embodiment, the mobile computing device 1300 is a portable phone system, such as a cellular phone. The mobile computing device 1300 may also include an optional keypad 1335. Optional keypad 1335 may be a physical keypad or a "soft" keypad generated on the touch screen display.

In various embodiments, the output elements include the display 1305 for showing a graphical user interface (GUI), a visual indicator 1320 (e.g., a light emitting diode), and/or an audio transducer 1325 (e.g., a speaker). In some aspects, the mobile computing device 1300 incorporates a vibration transducer for providing the user with tactile feedback. In yet another aspect, the mobile computing device 1300 incorporates input and/or output ports, such as an audio input (e.g., a microphone jack), an audio output (e.g., a headphone jack), and a video output (e.g., a HDMI port) for sending signals to or receiving signals from an external device.

FIG. 13B is a block diagram illustrating the architecture of one aspect of a mobile computing device. That is, the mobile computing device 1300 can incorporate a system (e.g., an architecture) 1302 to implement some aspects. In one embodiment, the system 1302 is implemented as a "smart phone" capable of running one or more applications (e.g., browser, e-mail, calendaring, contact managers, messaging clients, games, and media clients/players). In some aspects, the system 1302 is integrated as a computing device, such as an integrated personal digital assistant (PDA) and wireless phone.

One or more application programs 1366 may be loaded into the memory 1362 and run on or in association with the operating system 1364. Examples of the application programs include phone dialer programs, e-mail programs, personal information management (PIM) programs, word processing programs, spreadsheet programs, Internet browser programs, messaging programs, and so forth. The system 1302 also includes a non-volatile storage area 1368 within the memory 1362. The non-volatile storage area 1368 may be used to store persistent information that should not be lost if the system 1302 is powered down. The application programs 1366 may use and store information in the non-volatile storage area 1368, such as e-mail or other messages used by an e-mail application, and the like. A synchronization application (not shown) also resides on the system 1302 and is programmed to interact with a corresponding synchronization application resident on a host computer to keep the information stored in the non-volatile storage area 1368 synchronized with corresponding information stored at the host computer. As should be appreciated, other applications may be loaded into the memory 1362 and run on the mobile computing device 1300 described herein (e.g., search engine, extractor module, relevancy ranking module, answer scoring module, etc.).

The system 1302 has a power supply 1370, which may be implemented as one or more batteries. The power supply 1370 might further include an external power source, such as an AC adapter or a powered docking cradle that supplements or recharges the batteries.

The system 1302 may also include a radio interface layer 1372 that performs the function of transmitting and receiving radio frequency communications. The radio interface layer 1372 facilitates wireless connectivity between the system 1302 and the "outside world," via a communications carrier or service provider. Transmissions to and from the radio interface layer 1372 are conducted under control of the operating system 1364. In other words, communications received by the radio interface layer 1372 may be disseminated to the application programs 1366 via the operating system 1364, and vice versa.

The visual indicator 1320 may be used to provide visual notifications, and/or an audio interface 1374 may be used for producing audible notifications via the audio transducer 1325. In the illustrated embodiment, the visual indicator 1320 is a light emitting diode (LED) and the audio transducer 1325 is a speaker. These devices may be directly coupled to the power supply 1370 so that when activated, they remain on for a duration dictated by the notification mechanism even though the processor 1360 and other components might shut down for conserving battery power. The LED may be programmed to remain on indefinitely until the user takes action to indicate the powered-on status of the device. The audio interface 1374 is used to provide audible signals to and receive audible signals from the user. For example, in addition to being coupled to the audio transducer 1325, the audio interface 1374 may also be coupled to a microphone to receive audible input, such as to facilitate a telephone conversation. In accordance with embodiments of the present disclosure, the microphone may also serve as an audio sensor to facilitate control of notifications, as will be described below. The system 1302 may further include a video interface 1376 that enables an operation of an on-board camera 1330 to record still images, video stream, and the like.

A mobile computing device 1300 implementing the system 1302 may have additional features or functionality. For example, the mobile computing device 1300 may also include additional data storage devices (removable and/or non-removable) such as, magnetic disks, optical disks, or tape. Such additional storage is illustrated in FIG. 13B by the non-volatile storage area 1368.

Data/information generated or captured by the mobile computing device 1300 and stored via the system 1302 may be stored locally on the mobile computing device 1300, as described above, or the data may be stored on any number of storage media that may be accessed by the device via the radio interface layer 1372 or via a wired connection between the mobile computing device 1300 and a separate computing device associated with the mobile computing device 1300, for example, a server computer in a distributed computing network, such as the Internet. As should be appreciated such data/information may be accessed via the mobile computing device 1300 via the radio interface layer 1372 or via a distributed computing network. Similarly, such data/information may be readily transferred between computing devices for storage and use according to well-known data/information transfer and storage means, including electronic mail and collaborative data/information sharing systems.

FIG. 14 illustrates one aspect of the architecture of a system for processing data received at a computing system from a remote source, such as a personal computer 1404, tablet computing device 1406, or mobile computing device 1408, as described above. The personal computer 1404, tablet computing device 1406, or mobile computing device 1408 may include a user interface 1420 allowing a user to interact with one or more program modules as previously described. One or more of the previously described program modules 1206 or software applications 1207 may be employed by server device 1402 and/or the personal computer 1404, tablet computing device 1406, or mobile computing device 1408, as described above. For example, the server device 1402, and in many examples the personal computer 1404, tablet computing device 1406, and/or mobile computing device 1408 may include a document sketch generator 1412, a document & content receiving module 1416, a draft document editing module 1414, and the grounding information retrieval module 1418. The document sketch generator 1208 may be the same as or similar to the document sketch generator 212 previously described; the document & content receiving module 1210 may be the same as or similar to the document & content receiving module 244 as previously described; the draft document editing module 1414 may be the same as or similar to the draft document editing module 220 as previously described; and the grounding information retrieval module 1418 may be the same as or similar to the grounding information retrieve module 216 as previously described.

The server device 1402 may provide data to and from a client computing device such as a personal computer 1404, a tablet computing device 1406 and/or a mobile computing device 1408 (e.g., a smart phone) through a network 1410. By way of example, the computer system described above may be embodied in a personal computer 1404, a tablet computing device 1406 and/or a mobile computing device 1408 (e.g., a smart phone). Any of these embodiments of the computing devices may obtain content from the store 1422, in addition to receiving graphical data useable to be either pre-processed at a graphic-originating system, or post-processed at a receiving computing system. The store 1422 may also include the document & content repository 1424, which may be the same as or similar to the document & content repository 248 previously described.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

Examples of the present disclosure may be directed to a method of generating a document, where the method includes receiving an indication to create a document sketch; determining, based on the indication, a plurality of example documents and grounding content; receiving the plurality of example documents; receiving the grounding content; and generating the document sketch based on the example documents and the grounding content, the document sketch including a plurality of predicted text sequences.

In accordance with at least one aspect of the above example, the method may include receiving a user interaction associated with a content portion of the document sketch; and generating a revised document sketch based on the user interaction. In accordance with at least one aspect of the above example, the user interaction may include receiving a selection associated with the content portion of the document sketch; and causing alternative content structures associated with the content portion of the document sketch to be displayed to a user. In accordance with at least one aspect of the above example, the method may include receiving a selection of an alternative content structure; replacing the content structure associated with the received selection with the selected alternative content structure; and generating the revised document sketch based on the example documents, the grounding content, and the selected alternative content structure. In accordance with at least one aspect of the above example, the alternative content structures include predicted text sequences. In accordance with at least one aspect of the above example, the method may include identifying content of the document sketch having a confidence score that is less than a threshold; and causing the identified content to be displayed in a manner that is different from content of the document sketch having a confidence score that is greater than the threshold. In accordance with at least one aspect of the above example, the method may include receiving a selection associated with a content portion of the document sketch; and displaying underlying data associated with the selected content portion. In accordance with at least one aspect, the underlying data is grounding information associated with the selected content portion. In accordance with at least one aspect of the above example, the document sketch is generated utilizing a machine learning model trained on data that includes documents and grounding information. In accordance with at least one aspect of the above example, the grounding content includes at least one of an email, a spreadsheet, and a document containing text. In accordance with at least one aspect of the above example, the method includes receiving a second indication, the second indication indicating that the document sketch is to be revised with additional grounding content; determining, from the second indication, an additional data source; receiving grounding information from the additional data source; and generating a revised document sketch based on the additional grounding content. In accordance with at least one aspect of the above example, the method includes identifying content of the document sketch requiring additional user input; and causing the identified content to be displayed in a manner that is different from other content of the document sketch.

Another example of the present disclosure may be directed to a method of generating a document, where the method includes receiving an indication to create a document sketch; determining, based on the indication, a plurality of example documents and grounding content; receiving the plurality of example documents; receiving the grounding content; generating the document sketch based on the example documents and the grounding content, the document sketch including a plurality of predicted text sequences; identifying a predicted text sequence having an associated generation confidence score that is less than a threshold; and causing the identified predicted text sequence to be displayed at an output device in a manner that is different from a predicted text sequence having an associated generation confidence score that is greater than the threshold.

In accordance with at least one aspect of the above example, the method includes receiving a selection associated with the identified predicted text sequence; and causing a plurality of alternative predicted text sequences associated with the identified predicted text sequence to be displayed at the output device. In accordance with at least one aspect of the above example, the method includes replacing the identified predicted text sequence with a selected alternative predicted text sequence of the plurality of alternative predicted text sequences; and generating a revised document sketch based on the selected alternative predicted text sequence. In accordance with at least one aspect of the above example, the method includes generating the plurality of alternative predicted text sequences after receiving the selection associated with the identified predicted text sequence.

Another example of the present disclosure may be directed to a system comprising a processor; and memory, the memory including instructions which when executed by the processor, causes the processor to: receive a previously generated document sketch, the document sketch being based on a plurality of example documents; retrieve grounding content from a grounding content source; generate a revised document sketch based on the grounding content, the document sketch including a plurality of predicted text sequences based on the grounding content. In accordance with at least one aspect of the above example, the instructions cause the processor to display a predicted text sequence in a manner that is different from another predicted text sequence in the document sketch. In accordance with at least one aspect of the above example, the instructions cause the processor to: receive a selection associated with a predicted text sequence; and display grounding information associated with the selected predicted text sequence. In accordance with at least one aspect of the above example, the predicted text sequence is generated utilizing a machine learning model trained on data that includes training documents and training grounding information.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A method of generating a document, the method comprising:
   receiving an indication to create a document sketch;
   determining, based on the indication, a plurality of example documents and grounding content;
   receiving the plurality of example documents;
   receiving the grounding content; and
   generating, using a generative machine learning model, the document sketch based on the example documents and the grounding content, wherein the document sketch includes a plurality of generative text sequences that were produced by the generative machine learning model based at least in part on the grounding content, wherein the grounding content comprises relevant content for the document sketch and an identifier associated with the grounding content used to generate a predicted text sequence, and wherein grounding information derived from the grounding content is provided to the generative machine learning model to generate the predicted text sequence.

2. The method of claim 1, further comprising:
   receiving a user interaction associated with a content portion of the document sketch; and
   generating a revised document sketch based on the user interaction.

3. The method of claim 2, wherein the user interaction includes:
   receiving a selection associated with the content portion of the document sketch; and
   causing alternative content structures associated with the content portion of the document sketch to be displayed to a user.

4. The method of claim 3, further comprising:
   receiving a selection of an alternative content structure;
   replacing the content structure associated with the received selection with the selected alternative content structure; and
   generating the revised document sketch based on the example documents, the grounding content, and the selected alternative content structure.

5. The method of claim 3, wherein the alternative content structures include generative text sequences.

6. The method of claim 1, further comprising:
   identifying content of the document sketch having a confidence score that is less than a threshold; and
   causing the identified content to be displayed in a manner that is different from content of the document sketch having a confidence score that is greater than the threshold.

7. The method of claim 1, further comprising:
   receiving a selection associated with a content portion of the document sketch; and
   displaying underlying data associated with the selected content portion.

8. The method of claim 7, wherein the underlying data is grounding information associated with the selected content portion.

9. The method of claim 1, wherein the document sketch is generated utilizing a machine learning model trained on data that includes documents and grounding information.

10. The method of claim 1, wherein the grounding content includes at least one of an email, a spreadsheet, and a document containing text.

11. The method of claim 1, further comprising:
    receiving a second indication, the second indication indicating that the document sketch is to be revised with additional grounding content;
    determining, from the second indication, an additional data source;
    receiving grounding information from the additional data source; and
    generating a revised document sketch based on the additional grounding content.

12. The method of claim 1, further comprising:
    identifying content of the document sketch requiring additional user input; and
    causing the identified content to be displayed in a manner that is different from other content of the document sketch.

13. A method of generating a document, the method comprising:

receiving an indication to create a document sketch;
determining, based on the indication, a plurality of example documents and grounding content;
receiving the plurality of example documents;
receiving the grounding content;
generating, using a generative machine learning model, the document sketch based on the example documents and the grounding content, the document sketch including a plurality of generative text sequences and an identifier associated with the grounding content used to generate a predicted text sequence, and wherein grounding information derived from the grounding content is provided to the generative machine learning model to generate the predicted text sequence;
identifying a generative text sequence having an associated generation confidence score that is less than a threshold; and
causing the identified generative text sequence to be displayed at an output device in a manner that is different from a generative text sequence having an associated generation confidence score that is greater than the threshold.

14. The method of claim 13, further comprising:
receiving a selection associated with the identified generative text sequence; and
causing a plurality of alternative generative text sequences associated with the identified generative text sequence to be displayed at the output device.

15. The method of claim 14, further comprising:
replacing the identified generative text sequence with a selected alternative generative text sequence of the plurality of alternative generative text sequences; and
generating a revised document sketch based on the selected alternative generative text sequence.

16. The method of claim 14, further comprising generating the plurality of alternative generative text sequences after receiving the selection associated with the identified generative text sequence.

17. A system comprising:
a processor; and
memory, the memory including instructions which when executed by the processor, causes the processor to:
receive a previously generated document sketch, the document sketch being based on a plurality of example documents;
retrieve grounding content from a grounding content source; and
generate, using a generative machine learning model, a revised document sketch based on the grounding content, wherein the document sketch includes a plurality of generative text sequences based on the grounding content that were produced by the generative machine learning model based at least in part on the grounding content and an identifier associated with the grounding content used to generate a predicted text sequence, and wherein grounding information derived from the grounding content is provided to the generative machine learning model to generate the predicted text sequence.

18. The system of claim 17, wherein the instructions cause the processor to display a generative text sequence in a manner that is different from another generative text sequence in the document sketch.

19. The system of claim 18, wherein the generative text sequence is generated utilizing a machine learning model trained on data that includes training documents and training grounding information.

20. The method of claim 17, wherein each generative text sequence of the plurality of generative text sequences comprises a new text sequence that is not present in the plurality of example documents.

* * * * *